United States Patent
Azuma et al.

(10) Patent No.: US 10,738,207 B2
(45) Date of Patent: Aug. 11, 2020

(54) WATER-BASED PIGMENT DISPERSION

(71) Applicant: KAO CORPORATION, Tokyo (JP)

(72) Inventors: Koji Azuma, Wakayama (JP); Hirokazu Hyakuda, Izumisano (JP); Yusuke Shimizu, Osaka (JP); Tetsuya Eguchi, Wakayama (JP); Hiroki Kawaguchi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 256 days.

(21) Appl. No.: 15/779,771

(22) PCT Filed: Dec. 8, 2016

(86) PCT No.: PCT/JP2016/087320
§ 371 (c)(1),
(2) Date: May 29, 2018

(87) PCT Pub. No.: WO2017/115659
PCT Pub. Date: Jul. 6, 2017

(65) Prior Publication Data
US 2019/0284410 A1    Sep. 19, 2019

(30) Foreign Application Priority Data

Dec. 28, 2015 (JP) ................................. 2015-257513

(51) Int. Cl.
| | |
|---|---|
| C09D 11/322 | (2014.01) |
| C08F 220/06 | (2006.01) |
| C08F 220/18 | (2006.01) |
| C08J 3/24 | (2006.01) |
| C09D 11/326 | (2014.01) |
| C09D 11/328 | (2014.01) |

(52) U.S. Cl.
CPC .......... C09D 11/322 (2013.01); C08F 220/06 (2013.01); C08F 220/18 (2013.01); C08J 3/24 (2013.01); C09D 11/326 (2013.01); C09D 11/328 (2013.01)

(58) Field of Classification Search
CPC ... C09D 11/322; C09D 11/328; C09D 11/326; C08J 3/24; C08F 220/06; C08F 220/18
USPC ......................................................... 523/161
See application file for complete search history.

(56) References Cited

U.S. PATENT DOCUMENTS

| | | |
|---|---|---|
| 6,852,777 B1 | 2/2005 | Nakano et al. |
| 7,008,994 B1 | 3/2006 | Waki |
| 2003/0055135 A1 | 3/2003 | Alford |
| 2004/0030002 A1* | 2/2004 | Tsuru .................... C09D 11/30 523/160 |
| 2006/0030641 A1 | 2/2006 | Tanaka et al. |
| 2008/0002004 A1 | 1/2008 | O'Donnell et al. |
| 2011/0102529 A1* | 5/2011 | Yoshida ............... C09D 11/322 347/104 |
| 2011/0169900 A1 | 7/2011 | Annable et al. |
| 2011/0257309 A1 | 10/2011 | Yoshida et al. |
| 2012/0065293 A1 | 3/2012 | Bisson et al. |
| 2012/0219715 A1 | 8/2012 | Yoshida et al. |
| 2012/0232195 A1 | 9/2012 | Mcintyre et al. |
| 2014/0296393 A1 | 10/2014 | Valentini et al. |
| 2014/0363642 A1 | 12/2014 | Kawaguchi et al. |

(Continued)

FOREIGN PATENT DOCUMENTS

| | | |
|---|---|---|
| EP | 2 182 035 A1 | 5/2010 |
| EP | 2 495 290 A1 | 9/2012 |

(Continued)

OTHER PUBLICATIONS

Japanese Statement of Opposition issued in the corresponding Japanese Patent Application No. 2018-700637 on Aug. 30, 2018.
International Search Report for PCT/JP2016/087320 (PCT/ISA/210) dated Mar. 22, 2017.
Written Opinion of the International Searching Authority for PCT/JP2016/087320 (PCT/ISA/237) dated Mar. 22, 2017.

*Primary Examiner* — Doris L Lee

(74) *Attorney, Agent, or Firm* — Birch, Stewart, Kolasch & Birch, LLP

(57) ABSTRACT

The present invention relates to a water-based pigment dispersion having not only excellent storage stability capable of suppressing solidification of a pigment or the like in ink ejection nozzles, but also excellent ejection properties and fixing properties, while maintaining good water resistance of the pigment dispersion as an advantage attained by using the pigment therein. That is, the present invention relates to a water-based pigment dispersion including a pigment, a polymer dispersant and an aqueous medium in which the pigment is dispersed in the aqueous medium using the polymer dispersant, the polymer dispersant being a water-insoluble polymer including carboxy groups that are at least partially neutralized with an alkali metal hydroxide, and having a crosslinked structure obtained by reacting a part of the carboxy groups with a water-insoluble polyfunctional epoxy compound, said water-based pigment dispersion satisfying the following conditions 1 and 2: Condition 1: a value calculated according to the formula: {[100−(neutralization degree)−(crosslinking degree)]/100}×(acid value of carboxy group-containing water-insoluble polymer) being from 32 to 130 mgKOH/g; and Condition 2: a value calculated according to the formula: [(neutralization degree)/100]×(acid value of carboxy group-containing water-insoluble polymer) being from 48 to 144 mgKOH/g.

20 Claims, No Drawings

(56) References Cited

U.S. PATENT DOCUMENTS

| | | |
|---|---|---|
| 2015/0132545 A1 | 5/2015 | O'Donnell et al. |
| 2019/0161633 A1 | 5/2019 | Sato et al. |
| 2019/0284410 A1 | 9/2019 | Azuma et al. |

FOREIGN PATENT DOCUMENTS

| | | |
|---|---|---|
| JP | 2008-524369 A | 7/2008 |
| JP | 2009-91525 A | 4/2009 |
| JP | 2009-108115 A | 5/2009 |
| JP | 2009-275125 A | 11/2009 |
| JP | 2010-37363 A | 2/2010 |
| JP | 2011-94034 A | 5/2011 |
| JP | 2011-94075 A | 5/2011 |
| JP | 2011-137102 A | 7/2011 |
| JP | 2012-1675 A | 1/2012 |
| JP | 2012-504675 A | 2/2012 |
| JP | 2012-116927 A | 6/2012 |
| JP | 2012-136645 A | 7/2012 |
| JP | 2012-527510 A | 11/2012 |
| JP | 2013-511598 A | 4/2013 |
| JP | 2015-98506 A | 5/2015 |
| JP | 2015-196750 A | 11/2015 |
| JP | 2017-119845 A | 7/2017 |
| JP | 2017-149906 A | 8/2017 |
| WO | WO 99/52966 A1 | 10/1999 |
| WO | WO 2010/071177 A1 | 6/2010 |
| WO | WO 2018/074372 A1 | 4/2018 |

\* cited by examiner

WATER-BASED PIGMENT DISPERSION

FIELD OF THE INVENTION

The present invention relates to a water-based pigment dispersion and a process for producing a water-based ink.

BACKGROUND OF THE INVENTION

In ink-jet printing methods, droplets of ink are directly projected from very fine nozzles and allowed to adhere to a recording medium to form printed materials having characters or images printed on the recording medium, etc. The ink-jet printing methods have become rapidly spread because of various advantages such as easiness of full coloration, low cost, capability of using a plain paper as the recording medium, non-contact with printed characters or images on the recoding medium, etc. In particular, form the viewpoint of good weathering resistance and water resistance of the resulting printed materials, the ink-jet printing methods using an ink containing a pigment as a colorant has become predominant.

The pigment used in the ink is dispersed in an ink vehicle using a polymer dispersant. However, since molecules of the pigment are incapable of being uniformly dissolved in the ink vehicle unlike dyes, it is necessary to improve storage stability of the ink for maintaining a good dispersed state of the pigment in the ink, and suppress deterioration in ejection properties of the ink owing to solidification of the polymer or pigment in portions of ink ejection nozzles which tends to be caused by a poor dispersed state of the pigment in the ink after a long-term storage or use of the ink.

For example, WO 1999/052966A (Patent Literature 1) aims at obtaining a pigment dispersion that is excellent in water resistance, stability during the passage of time, etc., and discloses a water-based pigment dispersion obtained by dispersing a pigment with a thermoplastic resin containing a carboxy group at a specific ratio and then crosslinking the carboxy group-containing thermoplastic resin with a crosslinking agent, in which the ratio of the crosslinking agent to the carboxy group-containing thermoplastic resin (crosslinking agent/carboxy group-containing thermoplastic resin; in terms of a weight ratio of effective solid matters) in the dispersion is from 1/100 to 50/100. In Patent Literature 1, it is further described that the thermoplastic resin is preferably neutralized with an organic amine having a boiling point of at most 200° C., and the neutralization rate of the thermoplastic resin is preferably from about 100 to about 150%.

On the other hand, in order to solve the aforementioned problems by enhancing dispersion stability of the pigment in the ink vehicle, it is known to use a so-called self-dispersible pigment on a surface of which a chemical structure capable of allowing the pigment to exhibit good dispersion stability is directly formed without using any polymer dispersant. In the case of using such a self-dispersible pigment in the ink, although it is possible to suppress solidification of the pigment in the portions of ink ejection nozzles, there tends to arise such a problem that the resulting ink suffers from damage to water resistance thereof as an advantage attained by using the pigment in the ink.

SUMMARY OF THE INVENTION

The present invention relates to a water-based pigment dispersion including a pigment, a polymer dispersant and an aqueous medium in which the pigment is dispersed in the aqueous medium using the polymer dispersant, the polymer dispersant being a water-insoluble polymer containing carboxy groups that are at least partially neutralized with an alkali metal hydroxide, and having a crosslinked structure obtained by reacting a part of the carboxy groups with a water-insoluble polyfunctional epoxy compound, said water-based pigment dispersion satisfying the following conditions 1 and 2:

Condition 1: a value calculated according to the formula:

$$\{[100-(\text{neutralization degree})-(\text{crosslinking degree})]/100\} \times (\text{acid value of carboxy group-containing water-insoluble polymer}),$$

being not less than 32 mgKOH/g and not more than 130 mgKOH/g; and

Condition 2: a value calculated according to the formula:

$$[(\text{neutralization degree})/100] \times (\text{acid value of carboxy group-containing water-insoluble polymer}),$$

being not less than 48 mgKOH/g and not more than 144 mgKOH/g.

DETAILED DESCRIPTION OF THE INVENTION

In the water-based pigment dispersion described in Patent Literature 1, the resin dispersant for dispersing the pigment is three-dimensionally bonded to the pigment with the crosslinking agent containing a plurality of functional groups capable of reacting with a carboxy group in a molecule thereof, to thereby form a firm film, and it is therefore possible to ensure stability of the ink at room temperature to a certain extent. However, when storing the ink in a high-temperature condition for a long period of time, the ink tends to fail to ensure good stability and, as a result, fail to meet the recent increasing requirement for reliability of the ink.

The present invention relates to a water-based pigment dispersion having not only excellent storage stability capable of suppressing solidification of a pigment or a polymer in ink ejection nozzles, but also excellent ejection properties and fixing properties, while maintaining good water resistance of the resulting water-based pigment dispersion and water-based ink as an advantage attained by using the pigment therein; and a process for producing a water-based ink.

The most effective method for improving water resistance of the water-based ink is the method of strengthening a bonding force between pigment particles or a bonding force between the pigment particles and a recoding medium after bringing droplets of the ink into contact with the recording medium. In order to achieve the above improvement, it is considered to be effective that the amount of a polymer dispersant compounded in the water-based ink is increased to form a uniform dense film of the ink on the recording medium. However, when the amount of the polymer dispersant compounded in the ink is excessively large, the ink tends to suffer from undesirable adhesion even in the portions of ink ejection nozzles, which is disadvantageous in suppressing solidification of the pigment or polymer in the portions of ink ejection nozzles.

In consequence, the present inventors have made intense studies on properties of the ink which are not only capable of maintaining a liquid state of the ink under the environmental conditions in which an ink vehicle is still present, such as in the portions of ink ejection nozzles, but also capable of forming a firm film under the environmental conditions in which the ink vehicle is lost, such as upon contact with the recording medium in printing operations. As a result, it has been found that the above conventional problems can be solved by such a pigment dispersion prepared by dispersing a pigment with a polymer dispersant whose carboxy groups are at least partially neutralized with an alkali metal hydroxide and then subjecting the resulting dispersion to crosslinking reaction with a water-insoluble polyfunctional epoxy compound.

That is, the present invention relates to the following aspects [1] and [2].

[1] A water-based pigment dispersion including a pigment, a polymer dispersant and an aqueous medium in which the pigment is dispersed in the aqueous medium using the polymer dispersant, the polymer dispersant being a water-insoluble polymer containing carboxy groups that are at least partially neutralized with an alkali metal hydroxide, and having a crosslinked structure obtained by reacting a part of the carboxy groups with a water-insoluble polyfunctional epoxy compound, said water-based pigment dispersion satisfying the following conditions 1 and 2 (hereinafter also referred to merely as a "water-based pigment dispersion"):

Condition 1: a value calculated according to the formula:

$$\{[100-(\text{neutralization degree})-(\text{crosslinking degree})]/100\} \times (\text{acid value of carboxy group-containing water-insoluble polymer}),$$

being not less than 32 mgKOH/g and not more than 130 mgKOH/g; and

Condition 2: a value calculated according to the formula:

$$[(\text{neutralization degree})/100] \times (\text{acid value of carboxy group-containing water-insoluble polymer}),$$

being not less than 48 mgKOH/g and not more than 144 mgKOH/g, wherein the neutralization degree means a ratio of a mole equivalent number of the alkali metal hydroxide to a mole equivalent number of the carboxy groups of the water-insoluble polymer [(mole equivalent number of alkali metal hydroxide)/(mole equivalent number of carboxy groups of water-insoluble polymer)], and the crosslinking degree means a ratio of a mole equivalent number of epoxy groups of the water-insoluble polyfunctional epoxy compound to a mole equivalent number of the carboxy groups of the water-insoluble polymer [(mole equivalent number of epoxy groups of water-insoluble polyfunctional epoxy compound)/(mole equivalent number of carboxy groups of water-insoluble polymer)].

[2] A process for producing a water-based ink, including the following steps 1 to 4:

Step 1: neutralizing a carboxy group-containing water-insoluble polymer with an alkali metal hydroxide;

Step 2: mixing and dispersing the neutralized water-insoluble polymer obtained in the step 1 and a pigment in an aqueous medium to obtain a pigment water dispersion A;

Step 3: subjecting the pigment water dispersion A obtained in the step 2 to crosslinking treatment with a water-insoluble polyfunctional epoxy compound to obtain a water-based pigment dispersion B including the crosslinked water-insoluble polymer; and Step 4: mixing the water-based pigment dispersion B obtained in the step 3 with an organic solvent to obtain the water-based ink, said water-based ink satisfying the following conditions 1 and 2 representing a relationship between an acid value and a neutralization degree of the water-insoluble polymer in the step 1 and a crosslinking degree of the water-insoluble polymer in the step 3 (hereinafter also referred to merely as a "water-based ink"):

Condition 1: a value calculated according to the formula:

$$\{[100-(\text{neutralization degree})-(\text{crosslinking degree})]/100\} \times (\text{acid value of carboxy group-containing water-insoluble polymer}),$$

being not less than 32 mgKOH/g and not more than 130 mgKOH/g and

Condition 2: a value calculated according to the formula:

$$[(\text{neutralization degree})/100] \times (\text{acid value of carboxy group-containing water-insoluble polymer}),$$

being not less than 48 mgKOH/g and not more than 144 mgKOH/g, wherein the neutralization degree and the crosslinking degree mean the same meanings as defined above.

According to the present invention, it is possible to provide a water-based pigment dispersion having not only excellent storage stability capable of suppressing solidification of a pigment or a polymer in ink ejection nozzles, but also excellent ejection properties and fixing properties, while maintaining good water resistance of the resulting water-based pigment dispersion and water-based ink as an advantage attained by using the pigment therein; and a process for producing a water-based ink.

[Water-Based Pigment Dispersion]

The water-based pigment dispersion according to the present invention includes a pigment, a polymer dispersant and an aqueous medium in which the pigment is dispersed in the aqueous medium using the polymer dispersant, the polymer dispersant being a water-insoluble polymer containing carboxy groups that are at least partially neutralized with an alkali metal hydroxide, and having a crosslinked structure obtained by reacting a part of the carboxy groups with a water-insoluble polyfunctional epoxy compound, said water-based pigment dispersion satisfying the following conditions 1 and 2:

Condition 1: a value calculated according to the formula:

$$\{[100-(\text{neutralization degree})-(\text{crosslinking degree})]/100\} \times (\text{acid value of carboxy group-containing water-insoluble polymer}),$$

being not less than 32 mgKOH/g and not more than 130 mgKOH/g; and

Condition 2: a value calculated according to the formula:

$$[(\text{neutralization degree})/100] \times (\text{acid value of carboxy group-containing water-insoluble polymer}),$$

being not less than 48 mgKOH/g and not more than 144 mgKOH/g, wherein the neutralization degree means a ratio of a mole equivalent number of the alkali metal hydroxide to a mole equivalent number of the carboxy groups of the water-insoluble polymer [(mole equivalent number of alkali metal hydroxide)/(mole equivalent number of carboxy groups of water-insoluble polymer)], and the crosslinking degree means a ratio of a mole equivalent number of epoxy groups of the water-insoluble polyfunctional epoxy compound to a mole equivalent number of the carboxy groups of the water-insoluble polymer [(mole equivalent number of epoxy groups of water-insoluble polyfunctional epoxy compound)/(mole equivalent number of carboxy groups of water-insoluble polymer)].

Meanwhile, the term "water-based" as used herein means that water has a largest content among whole dispersing media used for dispersing the pigment in the dispersion.

The water-based pigment dispersion according to the present invention is capable of obtaining good printed characters or images that are excellent in storage stability, fixing properties and water resistance, and can be suitably used as a water-based pigment dispersion for inks for flexographic printing, inks for gravure printing or inks for ink-jet printing, in particular, as a water-based pigment dispersion for inks for ink-jet printing.

In addition, the water-based ink including the water-based pigment dispersion according to the present invention is excellent in continuous ejection stability and fixing properties when used in ink-jet printing methods, and therefore is preferably used as a water-based ink for ink-jet printing.

The water-based ink in which the water-based pigment dispersion according to the present invention is compounded can be enhanced in storage stability capable of suppressing solidification of the pigment or polymer in ink ejection nozzles and further improved in ejection properties and fixing properties. The reason why these advantages can be attained by the present invention is considered as follows though it is not clearly determined.

That is, in the water-based pigment dispersion according to the present invention, it is estimated that the water-insoluble polymer dispersant is adsorbed onto the surface of the pigment, and such a pigment is dispersed in the aqueous system. In addition, it is estimated that since the polymer dispersant is in the form of a crosslinked polymer, the water-insoluble polymer is adsorbed onto the pigment in such a condition that swelling of the polymer with a solvent compounded in the ink or the like is suppressed.

The value of the condition 1 represents an amount of free carboxy groups in the polymer dispersant which contribute to neither neutralization nor crosslinking thereof. In the case where the ink including the water-based pigment dispersion is ejected onto a recording medium to form printed characters or images thereon, when the value of the condition 1 lies within the range defined above, the water-insoluble polymer is capable of forming a firm film owing to a hydrogen bond derived from the carboxy groups upon removing the ink vehicle by drying. Therefore, it is estimated that the resulting ink can maintain good water resistance as an advantage attained by using a pigment therein, and is also excellent in fixing properties.

The value of the condition 2 represents an amount of carboxy groups in the polymer dispersant which are neutralized. When the value of the condition 2 lies within the range defined above, the affinity between the polymer dispersant adsorbed onto the pigment and the ink vehicle is kept in an optimum state. Therefore, it is estimated that the resulting ink can be enhanced in storage stability and ejection properties.

<Pigment>

The pigment used in the present invention may be either an inorganic pigment or an organic pigment, and may also be in the form of a lake pigment or a fluorescent pigment. In addition, the pigment may also be used in combination with an extender pigment, if required.

Specific examples of the inorganic pigment include carbon blacks, metal oxides such as titanium oxide, iron oxide, red iron oxide and chromium oxide, and iridescent nacreous pigments. In particular, carbon blacks are preferably used for black inks. The carbon blacks may include furnace blacks, thermal lamp blacks, acetylene blacks and channel blacks.

Specific examples of the organic pigment include azo pigments such as azo lake pigments, insoluble monoazo pigments, insoluble disazo pigments and chelate azo pigments; and polycyclic pigments such as phthalocyanine pigments, perylene pigments, perinone pigments, anthraquinone pigments, quinacridone pigments, dioxazine pigments, thioindigo pigments, isoindolinone pigments, quinophthalone pigments, diketopyrrolopyrrole pigments, benzimidazolone pigments and indanthrene pigments.

The hue of the organic pigment used in the present invention is not particularly limited, and there may be used any chromatic color pigment having a yellow color, a magenta color, a cyan color, a blue color, a red color, an orange color, a green color, etc.

Specific examples of the preferred organic pigments include one or more pigments selected from the group consisting of commercially available products marketed under the tradenames C.I. Pigment Yellow, C.I. Pigment Red, C.I. Pigment Orange, C.I. Pigment Violet, C.I. Pigment Blue and C.I. Pigment Green, etc., with various product numbers.

Examples of the extender pigment include silica, calcium carbonate and talc.

The aforementioned pigments may be used alone or in the form of a mixture of any two or more thereof.

In the present invention, the pigment is included in the water-based pigment dispersion or the water-based ink in the form of a pigment dispersed with a polymer dispersant or in the form of a pigment-containing polymer dispersant, i.e., pigment-containing water-insoluble polymer particles.

From the viewpoint of maintaining good water resistance of the resulting ink, suppressing solidification of the pigment in ink ejection nozzles and improving storage stability, fixing properties, etc., of the ink, it is preferred that the pigment is included in the water-based pigment dispersion or the water-based ink in the form of pigment-containing water-insoluble polymer particles (hereinafter also referred to merely as "pigment-containing polymer particles").

<Polymer Dispersant>

The polymer dispersant used in the present invention is constituted of a carboxy group-containing water-insoluble polymer whose carboxy groups are at least partially neutralized with an alkali metal hydroxide.

In the present invention, it is considered that by using the alkali metal hydroxide as a neutralizing agent, the water-insoluble polymer exhibits a large electric charge repulsion force after being neutralized therewith, so that the resulting water-based pigment dispersion or the water-based ink can be prevented from suffering from increase in viscosity and occurrence of aggregation of particles when stored, and further can be improved in storage stability, fixing properties, etc., to such an extent as to meet the recent requirement for a high reliability thereof.

Furthermore, as described hereinlater, from the viewpoint of not only maintaining good water resistance of the resulting dispersion or ink, but also ensuring excellent storage stability, ejection properties and fixing properties of the dispersion or ink, the polymer dispersant has a crosslinked structure obtained by reacting a part of the carboxy groups with a water-insoluble polyfunctional epoxy compound, and is capable of satisfying the aforementioned conditions 1 and 2.

(Water-Insoluble Polymer)

The carboxy group-containing water-insoluble polymer used in the present invention (hereinafter also referred to merely as a "water-insoluble polymer") has not only a function as a pigment dispersant capable of exhibiting the effect of dispersing the pigment therein, but also a function as a fixing agent for fixing the pigment on a recording medium.

The water-insoluble polymer is kept water-insoluble not only in a non-neutralized condition but also after neutralizing a part of the carboxy groups thereof. The term "water-insoluble" as used herein means that a water dispersion of the water-insoluble polymer does not become transparent. On the other hand, even if the water dispersion of the water-insoluble polymer looks to be transparent by naked eyes, in the case where Tyndall phenomenon is recognized in the water dispersion when observed under irradiation with laser light or ordinary light, the water-insoluble polymer is regarded as being water-insoluble.

The acid value of the water-insoluble polymer is attributed to the carboxy groups present therein. The acid value of the water-insoluble polymer is preferably not less than 200 mgKOH/g and more preferably not less than 220 mgKOH/g, and is also preferably not more than 320 mgKOH/g, more preferably not more than 300 mgKOH/g and even more preferably not more than 270 mgKOH/g. When the acid value of the water-insoluble polymer lies within the aforementioned range, the amount of the carboxy groups and the neutralized carboxy groups in the water-insoluble polymer is sufficient, and it is therefore possible to ensure good dispersion stability of the pigment in the resulting dispersion. In addition, the acid value of the water-insoluble polymer which lies within the aforementioned range is preferred from the viewpoint of well balancing affinity between the polymer dispersant and the aqueous medium, and interaction between the polymer dispersant and the pigment.

The acid value of the polymer may be calculated from a mass ratio between monomers constituting the polymer. In addition, the acid value of the polymer may also be determined by the method of dissolving or swelling the polymer in an adequate organic solvent (e.g., MEK) and subjecting the resulting solution to titration.

Examples of the configuration of the water-insoluble polymer present in the water-based pigment dispersion and the water-based ink include the configuration in which the polymer is adsorbed onto the pigment, the configuration in which the pigment is enclosed (encapsulated) in the polymer, and the configuration in which the polymer is not adsorbed onto the pigment. In the present invention, from the viewpoint of improving dispersion stability of the pigment, the water-insoluble polymer is preferably present in the form of pigment-containing polymer particles, and is more preferably present in such a configuration that the pigment is enclosed (encapsulated) in the polymer.

Examples of the water-insoluble polymer used in the present invention include at least one polymer selected from the group consisting of polyesters, polyurethanes and vinyl-based polymers. Among these polymers, preferred is at least one polymer selected from the group consisting of vinyl-based polymers obtained by addition-polymerizing a vinyl monomer selected from a vinyl compound, a vinylidene compound, a vinylene compound and the like, from the viewpoint of improving storage stability of the water-based pigment dispersion and the water-based ink.

The vinyl-based polymer as the polymer dispersant used in the present invention is preferably a vinyl-based polymer that is produced by copolymerizing a monomer mixture including (a) a carboxy group-containing monomer (hereinafter also referred to merely as a "component (a)") and (b) a hydrophobic monomer (hereinafter also referred to merely as a "component (b)") (such a mixture is hereinafter also referred to merely as a "monomer mixture"). The vinyl-based polymer contains a constitutional unit derived from the component (a) and a constitutional unit derived from the component (b). It is more preferred that the vinyl-based polymer further contains a constitutional unit derived from (c) a macromonomer (hereinafter also referred to merely as a "component (c)") and/or a constitutional unit derived from (d) a nonionic monomer (hereinafter also referred to merely as a "component (d)").

[(a) Carboxy Group-Containing Monomer]

The carboxy group-containing monomer (a) is preferably used as a monomer component of the water-insoluble polymer from the viewpoint of improving dispersion stability of the pigment-containing polymer particles in the water-based pigment dispersion and the water-based ink. As the carboxy group-containing monomer, there may be used carboxylic acid monomers.

Specific examples of the carboxylic acid monomers include acrylic acid, methacrylic acid, crotonic acid, itaconic acid, maleic acid, fumaric acid, citraconic acid and 2-methacryloyloxymethylsuccinic acid. Among these carboxylic acid monomers, preferred is at least one carboxylic acid selected from the group consisting of acrylic acid and methacrylic acid, and more preferred is acrylic acid.

[(b) Hydrophobic Monomer]

The hydrophobic monomer (b) is preferably used as a monomer component of the water-insoluble polymer from the viewpoint of improving dispersion stability of the pigment-containing polymer particles in the water-based pigment dispersion and the water-based ink. Examples of the hydrophobic monomer include alkyl (meth)acrylates and aromatic group-containing monomers which contain an alkyl group having not less than 1 and not more than 22 carbon atoms or an aryl group having not less than 6 and not more than 22 carbon atoms.

The preferred alkyl (meth)acrylates are those alkyl (meth) acrylates containing an alkyl group having 1 to 22 carbon atoms and preferably 6 to 18 carbon atoms. Examples of the alkyl (meth)acrylates include methyl (meth)acrylate, ethyl (meth)acrylate, propyl (meth)acrylate, butyl (meth)acrylate, amyl (meth)acrylate, cyclohexyl (meth)acrylate, 2-ethylhexyl (meth)acrylate, octyl (meth)acrylate, decyl (meth) acrylate, dodecyl (meth)acrylate, stearyl (meth)acrylate, isopropyl (meth)acrylate, isobutyl (meth)acrylate, tert-butyl (meth)acrylate, isoamyl (meth)acrylate, isooctyl (meth) acrylate, isodecyl (meth)acrylate, isododecyl (meth)acrylate and isostearyl (meth)acrylate.

Meanwhile, the terms "(meth)acrylate" means at least one compound selected from the group consisting of an acrylate and a methacrylate, and the term "(meth)" described hereinafter has the same meaning as defined above.

The aromatic group-containing monomer is preferably a vinyl monomer containing an aromatic group having 6 to 22 carbon atoms which may contain a substituent group containing a hetero atom, and more preferably a styrene-based monomer or an aromatic group-containing (meth)acrylate.

Specific examples of the preferred styrene-based monomer include styrene, 2-methyl styrene, vinyl toluene and divinyl benzene. Among these styrene-based monomers, more preferred are styrene and 2-methyl styrene.

Specific examples of the preferred aromatic group-containing (meth)acrylate include phenyl (meth)acrylate, benzyl (meth)acrylate and phenoxyethyl (meth)acrylate. Among these aromatic group-containing (meth)acrylates, more preferred is benzyl (meth)acrylate.

As the hydrophobic monomer (b), any two or more of the aforementioned monomers may be used, and combination of the styrene-based monomer and the aromatic group-containing (meth)acrylate may also be used.

[(c) Macromonomer]

The macromonomer (c) is in the form of a compound containing a polymerizable functional group at one terminal end thereof and having a number-average molecular weight of not less than 500 and not more than 100,000, and is preferably used as a monomer component of the water-insoluble polymer from the viewpoint of improving dispersion stability of the pigment-containing polymer particles in the water-based pigment dispersion and the water-based ink. The polymerizable functional group bonded to one terminal end of the macromonomer is preferably an acryloyloxy group or a methacryloyloxy group and more preferably a methacryloyloxy group.

The macromonomer (c) preferably has a number-average molecular weight of not less than 1,000 and not more than 10,000. Meanwhile, the number-average molecular weight of the macromonomer (c) may be measured by gel permeation chromatography using chloroform containing 1 mmol/L of dodecyl dimethylamine as a solvent and using polystyrene as a reference standard substance.

As the macromonomer (c), from the viewpoint of improving dispersion stability of the pigment-containing polymer particles in the water-based pigment dispersion and the water-based ink, there are preferably used an aromatic group-containing monomer-based macromonomer and a silicone-based macromonomer. Among these macromonomers, more preferred is the aromatic group-containing monomer-based macromonomer.

Examples of an aromatic group-containing monomer constituting the aromatic group-containing monomer-based macromonomer include those aromatic group-containing monomers as described above with respect to the hydrophobic monomer (b). Among these aromatic group-containing monomers, preferred are styrene and benzyl (meth)acrylate, and more preferred is styrene.

Specific examples of the styrene-based macromonomer include "AS-6(S)", "AN-6(S)" and "HS-6(S)" (tradenames) all available from Toagosei Co., Ltd., etc.

Examples of the silicone-based macromonomer include organopolysiloxanes containing a polymerizable functional group bonded to one terminal end thereof, etc.

[(d) Nonionic Monomer]

From the viewpoint of improving dispersion stability of the pigment-containing polymer particles in the water-based pigment dispersion and the water-based ink, it is preferred that the water-insoluble polymer further contains (d) a nonionic monomer as a monomer component thereof. More specifically, the water-insoluble polymer preferably further contains a constitutional unit derived from the nonionic monomer (d).

Examples of the nonionic monomer (d) include 2-hydroxyethyl (meth)acrylate, 3-hydroxypropyl (meth)acrylate, a polyalkylene glycol (meth)acrylate such as polypropylene glycol (n=2 to 30 wherein n represents an average molar number of addition of oxyalkylene groups: hereinafter defined in the same way) (meth)acrylate and polyethylene glycol (n=2 to 30) (meth) acrylate, an alkoxy polyalkylene glycol (meth)acrylate such as methoxy polyethylene glycol (n=1 to 30) (meth)acrylate, and phenoxy (ethylene glycol/propylene glycol copolymer) (n=1 to 30 in which n for ethylene glycol: 1 to 29) (meth)acrylate. Among these nonionic monomers, preferred are polypropylene glycol (n=2 to 30) (meth)acrylate and phenoxy (ethylene glycol/propylene glycol copolymer) (meth)acrylate, more preferred is polypropylene glycol (n=2 to 30) (meth)acrylate.

Specific examples of commercially available products of the component (d) include "NK ESTER M-20G", "NK ESTER M-40G", "NK ESTER M-90G" and "NK ESTER M-230G" all available from Shin-Nakamura Chemical Co., Ltd.; and "BLEMMER PE-90", "BLEMMER PE-200", "BLEMMER PE-350", "BLEMMER PME-100", "BLEMMER PME-200", "BLEMMER PME-400", "BLEMMER PP-500", "BLEMMER PP-800", "BLEMMER PP-1000", "BLEMMER AP-150", "BLEMMER AP-400", "BLEMMER AP-550", "BLEMMER 50PEP-300", "BLEMMER 50POEP-800B" and "BLEMMER 43PAPE-600B" all available from NOF Corporation.

These components (a) to (d) may be respectively used alone or in the form of a mixture of any two or more thereof.

As described above, the carboxy group-containing water-insoluble polymer used in the present invention is preferably a vinyl-based polymer containing a constitutional unit derived from at least one carboxy group-containing monomer (a) selected from the group consisting of acrylic acid and methacrylic acid and a constitutional unit derived from at least one hydrophobic monomer (b) selected from the group consisting of an acrylate monomer, a methacrylate monomer and an aromatic group-containing monomer, and more preferably the vinyl-based polymer further containing a constitutional unit derived from the macromonomer (c) and a constitutional unit derived from the nonionic monomer (d).

(Contents of Respective Components or Constitutional Units in Monomer Mixture or Polymer)

The contents of the aforementioned components (a) and (b) in the monomer mixture (contents of non-neutralized components; hereinafter defined in the same way) upon production of the water-insoluble polymer, or the contents of the constitutional units derived from the components (a) and (b) in the water-insoluble polymer are as follows, from the viewpoint of improving dispersion stability of the pigment-containing polymer particles in the resulting water-based ink.

The content of the component (a) is preferably not less than 10% by mass, more preferably not less than 20% by mass and even more preferably not less than 25% by mass, and is also preferably less than 75% by mass, more preferably less than 60% by mass and even more preferably less than 55% by mass.

The content of the component (b) is preferably not less than 35% by mass, more preferably not less than 40% by mass and even more preferably not less than 45% by mass, and is also preferably less than 90% by mass, more preferably less than 80% by mass and even more preferably less than 75% by mass.

In the case of further including the component (c) and/or the component (d), the contents of the aforementioned components (a) to (d) in the monomer mixture upon production of the water-insoluble polymer, or the contents of the constitutional units derived from the components (a) to (d) in the water-insoluble polymer are as follows, from the viewpoint of improving. dispersion stability of the pigment-containing polymer particles in the resulting water-based ink.

The content of the component (a) is preferably not less than 3% by mass, more preferably not less than 5% by mass and even more preferably not less than 7% by mass, and is also preferably not more than 30% by mass, more preferably not more than 28% by mass and even more preferably not more than 25% by mass.

The content of the component (b) is preferably not less than 25% by mass, more preferably not less than 30% by mass and even more preferably not less than 35% by mass, and is also preferably not more than 60% by mass, more preferably not more than 55% by mass and even more preferably not more than 50% by mass.

In the case of including the component (c), the content of the component (c) is preferably not less than 3% by mass, more preferably not less than 5% by mass and even more preferably not less than 8% by mass, and is also preferably not more than 30% by mass, more preferably not more than 25% by mass and even more preferably not more than 20% by mass.

In the case of including the component (d), the content of the component (d) is preferably not less than 5% by mass, more preferably not less than 10% by mass and even more preferably not less than 15% by mass, and is also preferably not more than 40% by mass, more preferably not more than 35% by mass and even more preferably not more than 30% by mass.

The mass ratio of the component (a) to the component (b) [component (a)/component (b)] is preferably not less than 0.05, more preferably not less than 0.15 and even more preferably not less than 0.25, and is also preferably not more than 1.2, more preferably not more than 0.80 and even more preferably not more than 0.60.

In addition, in the case of including the component (c), the mass ratio of the component (a) to a sum of the component (b) and the component (c) [component (a)/[component (b)+ component (c)]] is preferably not less than 0.01, more preferably not less than 0.05 and even more preferably not less than 0.10, and is also preferably not more than 1.0, more preferably not more than 0.80 and even more preferably not more than 0.60.

(Production of Water-Insoluble Polymer)

The water-insoluble polymer may be produced by copolymerizing the monomer mixture by known polymerization methods such as bulk polymerization, solution polymerization, suspension polymerization and emulsion polymerization. Among these polymerization methods, preferred is the solution polymerization method.

The solvent used in the solution polymerization method is not particularly limited, and is preferably an organic polar solvent. The organic polar solvent miscible with water may be used in the form of a mixture with water. Examples of the organic polar solvents include aliphatic alcohols having 1 to 3 carbon atoms; ketones having 3 to 5 carbon atoms; ethers; and esters such as ethyl acetate. Among these organic polar solvents, preferred are methanol, ethanol, acetone, methyl ethyl ketone and mixed solvents of at least one of these compounds with water, and more preferred is a mixed solvent of methyl ethyl ketone and water.

The polymerization may be carried out in the presence of a polymerization initiator or a chain transfer agent.

Examples of the polymerization initiator include conventionally known radical polymerization initiators, e.g., azo compounds such as 2,2'-azobisisobutyronitrile and 2,2'-azobis(2,4-dimethylvaleronitrile), and organic peroxides such as t-butyl peroxyoctoate and dibenzoyl peroxide. The amount of the radical polymerization initiator used in the polymerization is preferably from 0.001 to 5 mol and more preferably from 0.01 to 2 mol per 1 mol of the monomer mixture.

Examples of the chain transfer agent include conventionally known chain transfer agents, e.g., mercaptans such as octyl mercaptan and 2-mercapto ethanol, and thiuram disulfides.

In addition, the type of a polymerization chain of the monomer polymerized is not particularly limited, and may be of any of a random type, a block type and a graft type, etc.

The preferred polymerization conditions may vary depending upon the kinds of polymerization initiators, monomers and solvents used, etc. In general, the polymerization temperature is preferably not lower than 30° C. and more preferably not lower than 50° C., and is also preferably not higher than 95° C. and more preferably not higher than 80° C. The polymerization time is preferably not less than 1 hour and more preferably not less than 2 hours, and is also preferably not more than 20 hours and more preferably not more than 10 hours. Furthermore, the polymerization is preferably conducted in a nitrogen gas atmosphere or an atmosphere of an inert gas such as argon.

After completion of the polymerization reaction, the polymer produced may be isolated from the obtained reaction solution by known methods such as reprecipitation and removal of the solvent by distillation. In addition, the resulting polymer may be purified by removing the unreacted monomers, etc., from the reaction solution by reprecipitation, membrane separation, chromatography, extraction, etc.

In the present invention, as the method of dispersing the pigment using the polymer dispersant, any optional conventionally known methods may be used. However, the method capable of obtaining the below-mentioned water dispersion of the pigment-containing polymer particles is preferably adopted. From the viewpoint of enhancing productivity of the water dispersion of the pigment-containing polymer particles, the obtained water-insoluble polymer is preferably used as such in the form of a water-insoluble polymer solution without removing the solvent used in the aforementioned polymerization reaction therefrom in order to use the organic solvent contained therein as an organic solvent used in the below-mentioned step I.

The solid content of the water-insoluble polymer solution is preferably not less than 30% by mass and more preferably not less than 40% by mass, and is also preferably not more than 70% by mass and more preferably not more than 65% by mass from the viewpoint of enhancing productivity of the water dispersion of the pigment-containing polymer particles.

The number-average molecular weight of the water-insoluble polymer used in the present invention is preferably not less than 2,000 and more preferably not less than 5,000, and is also preferably not more than 20,000 and more preferably not more than 18,000. The weight-average molecular weight of the water-insoluble polymer used in the present invention is preferably not less than 6,000 and more preferably not less than 8,000, and is also preferably not more than 80,000 and more preferably not more than 40,000. When these molecular weights of the water-insoluble polymer used in the present invention lie within the aforementioned ranges, the water-insoluble polymer has sufficient adsorption to the pigment, and the resulting dispersion can exhibit good dispersion stability.

Meanwhile, the number-average molecular weight may be measured by the method described in Examples below.

[Production of Pigment-Containing Polymer Particles]

The water-insoluble polymer particles containing the pigment (pigment-containing polymer particles) can be efficiently produced in the form of a water dispersion thereof by the process including the following steps I and II.

Step I; subjecting a mixture including the water-insoluble polymer, an organic solvent, the pigment and water (hereinafter also referred to as a "pigment mixture") to dispersion treatment to obtain a dispersion of pigment-containing polymer particles;

Step II; removing the organic solvent from the dispersion obtained in the step I to obtain a water dispersion of the pigment-containing polymer particles (hereinafter also referred to merely as a "pigment water dispersion"); and Step III; subjecting the pigment water dispersion obtained in the step II to crosslinking treatment with a water-insoluble polyfunctional epoxy compound to obtain a water-based pigment dispersion containing the crosslinked water-insoluble polymer.

(Step I)

In the step I, it is preferred that the water-insoluble polymer is first dissolved in the organic solvent, and then the pigment and water, if required, together with a neutralizing agent, a surfactant and the like, are added and mixed in the resulting organic solvent solution to obtain a dispersion of an oil-in-water type. The order of addition of the respective components added to the organic solvent solution of the water-insoluble polymer is not particularly limited, and it is preferred that water, the neutralizing agent and the pigment are successively added to the organic solvent solution in this order.

The organic solvent in which the water-insoluble polymer can be dissolved is not particularly limited, and is preferably selected from aliphatic alcohols having 1 to 3 carbon atoms, ketones, ethers, esters and the like. Of these organic solvents, from the viewpoints of improving wettability to the pigment, solubility of the water-insoluble polymer and adsorption of the water-insoluble polymer onto the pigment, more preferred are ketones having not less than 4 and not more than 8 carbon atoms, even more preferred are methyl ethyl ketone and methyl isobutyl ketone, and further even more preferred is methyl ethyl ketone.

When the water-insoluble polymer is synthesized by a solution polymerization method, the solvent used in the polymerization method may be directly used as such in the step I.

(Neutralization)

The carboxyl groups contained in the water-insoluble polymer may be at least partially neutralized using a neutralizing agent. When neutralizing the water-insoluble polymer, the pH value of the water-insoluble polymer is preferably controlled to not less than 7 and not more than 11.

From the viewpoint of improving water resistance, storage stability, fixing properties, etc., of the resulting water-based pigment dispersion and water-based ink, an alkali metal hydroxide may be used as the neutralizing agent. Specific examples of the alkali metal hydroxide include lithium hydroxide, sodium hydroxide, potassium hydroxide and cesium hydroxide. Of these alkali metal hydroxides, preferred are sodium hydroxide and potassium hydroxide. Also, the water-insoluble polymer may be previously neutralized.

The neutralizing agent is preferably used in the form of an aqueous neutralizing agent solution from the viewpoint of sufficiently and uniformly accelerating the neutralization of the carboxy groups of the polymer. From the same viewpoint as described above, the concentration of the aqueous neutralizing agent solution is preferably not less than 3% by mass, more preferably not less than 10% by mass and even more preferably not less than 15% by mass, and is also preferably not more than 50% by mass and more preferably not more than 25% by mass.

The neutralization degree of the carboxy groups of the water-insoluble polymer is preferably not less than 10 mol %, more preferably not less than 15 mol %, even more preferably not less than 20 mol % and further even more preferably not less than 25 mol %, and is also preferably not more than 60 mol %, more preferably not more than 55 mol %, even more preferably not more than 50 mol % and further even more preferably not more than 45 mol % from the viewpoint of improving water resistance, storage stability, fixing properties, etc., of the resulting water-based pigment dispersion and water-based ink.

The neutralization degree as used herein means the value calculated by dividing a mole equivalent number of the alkali metal hydroxide by a mole equivalent number of the carboxy groups of the water-insoluble polymer [(mole equivalent number of alkali metal hydroxide)/(mole equivalent number of carboxy groups of water-insoluble polymer)]. The neutralization degree basically never exceeds 100 mol %. However, since the neutralization degree defined in the present invention is calculated from the mole equivalent number of the alkali metal hydroxide, the neutralization degree will exceed 100 mol % if the alkali metal hydroxide is used in an excessively large amount.

(Contents of Respective Components in Pigment Mixture)

The contents of the respective components in the pigment mixture are as follows from the viewpoint of improving water resistance, storage stability, fixing properties and ejection properties of the resulting water-based pigment dispersion as well as from the viewpoint of enhancing productivity of the water-based pigment dispersion.

The content of the pigment in the pigment mixture used in the step I is preferably not less than 5% by mass, more preferably not less than 10% by mass and even more preferably not less than 12.5% by mass, and is also preferably not more than 30% by mass, more preferably not more than 25% by mass and even more preferably not more than 20% by mass.

The content of the water-insoluble polymer in the pigment mixture is preferably not less than 1.0% by mass, more preferably not less than 2.0% by mass and even more preferably not less than 3.0% by mass, and is also preferably not more than 8.0% by mass, more preferably not more than 7.0% by mass and even more preferably not more than 6.0% by mass.

The content of the organic solvent in the pigment mixture is preferably not less than 5% by mass, more preferably not less than 7% by mass and even more preferably not less than 10% by mass, and is also preferably not more than 35% by mass, more preferably not more than 30% by mass and even more preferably not more than 25% by mass.

The content of water in the pigment mixture is preferably not less than 40% by mass, more preferably not less than 45% by mass and even more preferably not less than 50% by mass, and is also preferably not more than 85% by mass, more preferably not more than 80% by mass and even more preferably not more than 75% by mass.

The mass ratio of the pigment to the water-insoluble polymer [pigment/water-insoluble polymer] in the pigment mixture is preferably not less than 30/70, more preferably not less than 40/60 and even more preferably not less than 50/50, and is also preferably not more than 90/10, more preferably not more than 80/20 and even more preferably not more than 70/25, from the viewpoint of improving water resistance, storage stability, fixing properties, etc., of the resulting water-based pigment dispersion.

(Dispersion Treatment of Pigment Mixture)

In the step I, the pigment mixture is subjected to dispersion treatment to obtain a dispersion of the pigment-containing polymer particles. The dispersing method for obtaining the above dispersion is not particularly limited. The pigment particles may be atomized into fine particles having a desired average particle size only by a substantial dispersion treatment. However, it is preferred that the pigment mixture is first subjected to a preliminary dispersion treatment, and then further subjected to the substantial dispersion treatment by applying a shear stress thereto so as to control the average particle size of the obtained pigment particles to a desired value.

The temperature used in the step I, in particular, the temperature used in the preliminary dispersion treatment in the step I, is preferably not lower than 0° C., and is also preferably not higher than 40° C., more preferably not higher than 30° C. and even more preferably not higher than 25° C. The dispersing time is preferably not less than 0.5 hour and more preferably not less than 0.8 hour, and is also preferably not more than 30 hours, more preferably not more than 10 hours and even more preferably not more than 5 hours.

When subjecting the pigment mixture to the preliminary dispersion treatment, there may be used ordinary mixing and stirring devices such as anchor blades and disper blades. Of these devices, preferred are high-speed stirring mixers.

As a means for applying a shear stress to the pigment mixture in the substantial dispersion treatment, there may be used, for example, kneading machines such as roll mills and kneaders, high-pressure homogenizers such as "MICROFLUIDIZER" available from Microfluidics Corporation, and media-type dispersers such as paint shakers and beads mills. Examples of the commercially available media-type dispersers include "Ultra Apex Mill" available from Kotobuki Industries Co., Ltd., and "Pico Mill" available from Asada Iron Works Co., Ltd. These devices may be used in combination of any two or more thereof. Among these devices, the high-pressure homogenizers are preferably used from the viewpoint of reducing a particle size of the pigment.

In the case where the substantial dispersion treatment is conducted using the high-pressure homogenizer, the particle size of the pigment can be adjusted to a desired value by controlling the treating pressure and the number of passes through the homogenizer used in the substantial dispersion treatment.

The treating pressure used in the substantial dispersion treatment is preferably not less than 60 MPa, more preferably not less than 100 MPa and even more preferably not less than 130 MPa, and is also preferably not more than 200 MPa and more preferably not more than 180 MPa, from the viewpoint of enhancing productivity and cost efficiency.

Also, the number of passes through the homogenizer used in the substantial dispersion treatment is preferably not less than 3 and more preferably not less than 10, and is also preferably not more than 30 and more preferably not more than 25.

(Step II)

In the step II, by removing the organic solvent from the dispersion obtained in the step I by any known methods, it is possible to obtain a water dispersion of the pigment-containing polymer particles (pigment water dispersion). The organic solvent is preferably substantially completely removed from the thus obtained pigment water dispersion. However, the residual organic solvent may be present in the pigment water dispersion unless the objects and effects of the present invention are adversely affected by the residual organic solvent. The content of the residual organic solvent in the pigment water dispersion is preferably not more than 0.1% by mass and more preferably not more than 0.01% by mass.

In addition, if required, the dispersion may be subjected to heating and stirring treatments before removing the organic solvent therefrom by distillation.

In the thus-obtained pigment water dispersion, the pigment-containing polymer particles are dispersed in a medium containing water as a main medium. The configuration of the pigment-containing polymer particles in the pigment water dispersion is not particularly limited, and the pigment-containing polymer particles may have any configuration as long as the particles are formed of at least the pigment and the water-insoluble polymer. Examples of the configuration of the pigment-containing polymer particles include the particle configuration in which the pigment is enclosed in the water-insoluble polymer, the particle configuration in which the pigment is uniformly dispersed in the water-insoluble polymer, and the particle configuration in which the pigment is exposed onto a surface of the respective water-insoluble polymer particles, as well as mixtures of these particle configurations.

The concentration of the non-volatile components (solid content) in the resulting pigment water dispersion is preferably not less than 10% by mass and more preferably not less than 15% by mass, and is also preferably not more than 30% by mass and more preferably not more than 25% by mass from the viewpoint of improving dispersion stability of the pigment water dispersion as well as from the viewpoint of facilitating preparation of the water-based ink.

Meanwhile, the solid content of the pigment water dispersion may be measured by the method described in Examples below.

The average particle size of the pigment-containing polymer particles in the pigment water dispersion is preferably not less than 50 nm, more preferably not less than 60 nm and even more preferably not less than 70 nm, and is also preferably not more than 200 nm, more preferably not more than 160 nm and even more preferably not more than 150 nm, from the viewpoints of suppressing formation of coarse particles and improving ejection stability of the resulting water-based ink.

Meanwhile, the average particle size of the pigment-containing polymer particles may be measured by the method described in Examples below.

The average particle size of the pigment-containing polymer particles in the water-based ink is the same as the average particle size of the particles in pigment water dispersion, and the preferred ranges of the average particle size of the pigment-containing polymer particles in the water-based ink are also the same as those of the average particle size of the particles in pigment water dispersion.

(Step III)

In the step III, from the viewpoint of improving water resistance, storage stability, ejection properties and fixing properties of the resulting water-based pigment dispersion and water-based ink, the pigment water dispersion obtained in the step II is subjected to crosslinking treatment with the below-mentioned water-insoluble polyfunctional epoxy compound (crosslinking agent) to obtain a water-based pigment dispersion containing the crosslinked water-insoluble polymer. In this step, a part of the carboxy groups contained in the water-insoluble polymer constituting the pigment-containing polymer particles are crosslinked to form a crosslinked structure on a surface layer of the respective pigment-containing polymer particles. As a result, the water-insoluble polymer that is contained in the pigment-containing polymer particles dispersed in the pigment water dispersion is crosslinked with the crosslinking agent and formed into the crosslinked water-insoluble polymer.

In this case, it is preferred that the pigment water dispersion obtained in the aforementioned step II is mixed with the water-insoluble polyfunctional epoxy compound to subject the pigment water dispersion to crosslinking treatment with the epoxy compound, thereby obtaining the water-based pigment dispersion according to the present invention. By conducting such a procedure, the water-based pigment dispersion according to the present invention is obtained in the form of a water-based pigment dispersion in which the pigment is dispersed in the aqueous medium with the polymer dispersant.

<Water-Insoluble Polyfunctional Epoxy Compound>

The solubility in water of the water-insoluble polyfunctional epoxy compound used in the present invention as measured by dissolving the epoxy compound in 100 g of water at 20° C. is preferably not more than 50 g, more preferably not more than 40 g and even more preferably not more than 35 g from the viewpoint of allowing the epoxy compound to efficiently react with the carboxy groups contained in the water-insoluble polymer in the medium containing water as a main component.

In addition, from the viewpoint of improving water resistance, storage stability, ejection properties and fixing properties of the resulting water-based pigment dispersion and water-based ink, the water solubility rate (mass ratio) of the water-insoluble polyfunctional epoxy compound is preferably not more than 50%, more preferably not more than 40% and even more preferably not more than 35%. The "water solubility rate (%; mass ratio)" as used herein means a rate (%) of dissolution of the water-insoluble polyfunctional epoxy compound as measured by dissolving 10 parts by mass of the epoxy compound in 90 parts by mass of water at room temperature (25° C.). More specifically, the water solubility rate may be measured by the method described in Examples below.

The water-insoluble polyfunctional epoxy compound is preferably a compound containing two or more epoxy groups in a molecule thereof, more preferably a glycidyl ether group-containing compound, and even more preferably a glycidyl ether compound of a polyhydric alcohol containing a hydrocarbon group having not less than 3 and not more than 8 carbon atoms.

The molecular weight of the water-insoluble polyfunctional epoxy compound is preferably not less than 120, more preferably not less than 150 and even more preferably not less than 200, and is also preferably not more than 2,000, more preferably not more than 1,500 and even more preferably not more than 1,000, from the viewpoint of facilitated reaction and good storage stability of the resulting crosslinked polymer.

The number of epoxy groups contained per one molecule of the water-insoluble polyfunctional epoxy compound is not less than 2 and preferably not less than 3, and is also preferably not more than 6 from the viewpoint of allowing the epoxy compound to efficiently react with the carboxy groups of the water-insoluble polymer to enhance storage stability, etc., of the pigment-containing polymer particles, and more preferably not more than 4 from the viewpoint of good market availability.

Specific examples of the water-insoluble polyfunctional epoxy compound include polyglycidyl ethers such as polypropylene glycol diglycidyl ether (water solubility rate: 31%), glycerin polyglycidyl ether, glycerol polyglycidyl ether, polyglycerol polyglycidyl ether, trimethylol propane polyglycidyl ether (water solubility rate: 27%), sorbitol polyglycidyl ether, pentaerythritol polyglycidyl ether, resorcinol diglycidyl ether, neopentyl glycol diglycidyl ether and hydrogenated bisphenol A-type diglycidyl ether.

Of these water-insoluble polyfunctional epoxy compounds, preferred is at least one compound selected from the group consisting of trimethylol propane polyglycidyl ether (water solubility rate: 27%) and pentaerythritol polyglycidyl ether (water-insoluble).

(Crosslinking Reaction)

In the present invention, the carboxy groups contained in the water-insoluble polymer as the polymer dispersant are partially neutralized to disperse the pigment in the aqueous medium, thereby obtaining the pigment water dispersion. Thereafter, a part of the carboxy groups contained in the water-insoluble polymer are further reacted with the water-insoluble polyfunctional epoxy compound to form a crosslinked structure in the polymer dispersant, so that it is possible to obtain the water-based pigment dispersion in which the pigment is dispersed in the aqueous medium using the polymer dispersant. In this case, from the viewpoint of improving water resistance, storage stability, ejection properties and fixing properties of the resulting water-based pigment dispersion and water-based ink, the following conditions 1 and 2 are preferably satisfied, and it is more preferred that the water-insoluble polyfunctional epoxy compound is used in an amount capable of satisfying the following condition 3.

[Condition 1]

The condition 1 is such a requirement that a value calculated according to the formula:

$$\{[100-(\text{neutralization degree})-(\text{crosslinking degree})]/100\} \times (\text{acid value of carboxy group-containing water-insoluble polymer}),$$

is not less than 32 mgKOH/g and not more than 130 mgKOH/g.

The value of the condition 1 represents an amount of the carboxy groups that are neither neutralized nor reacted with the water-insoluble polyfunctional epoxy compound (residual acid value), and is calculated on the basis of the water-insoluble polymer before being reacted with the water-insoluble polyfunctional epoxy compound.

When the value of the condition 1 is not less than 32 mgKOH/g, preferably not less than 35 mgKOH/g, more preferably not less than 40 mgKOH/g, even more preferably not less than 45 mgKOH/g, further even more preferably not less than 48 mgKOH/g, further even more preferably not less than 55 mgKOH/g and still further even more preferably not less than 65 mgKOH/g, the resulting water-based pigment dispersion or water-based ink is capable of ensuring good stability without causing any damage to dispersion stability thereof owing to electrostatic repulsion. On the other hand, when the value of the condition 1 is not more than 130 mgKOH/g, preferably not more than 120 mgKOH/g, more preferably not more than 100 mgKOH/g and even more preferably not more than 90 mgKOH/g, the water-insoluble polymer is prevented from suffering from swelling, so that the resulting water-based pigment dispersion or water-based ink is capable of forming a firm film and ensuring excellent water resistance and fixing properties.

[Condition 2]

The condition 2 is such a requirement that a value calculated according to the formula:

$$[(\text{neutralization degree})/100] \times (\text{acid value of carboxy group-containing water-insoluble polymer}),$$

is not less than 48 mgKOH/g and not more than 144 mgKOH/g.

The value of the condition 2 represents an amount of neutralization of the carboxy groups contained in the water-insoluble polymer.

When the value of the condition 2 is not less than 48 mgKOH/g, preferably not less than 60 mgKOH/g, more preferably not less than 65 mgKOH/g and even more preferably not less than 70 mgKOH/g, the resulting water-based pigment dispersion or water-based ink is capable of ensuring good storage stability without causing any damage to dispersion stability thereof owing to electrostatic repulsion. On the other hand, when the amount of neutralization of the carboxy groups contained in the water-insoluble polymer is not more than 144 mgKOH/g, preferably not more than 120 mgKOH/g and more preferably not more than 110 mgKOH/g, the resulting water-based pigment dispersion or water-based ink is capable of ensuring good storage stability without causing any damage to adsorption of the water-insoluble polymer to the pigment.

Furthermore, from the viewpoint of improving storage stability in a high-temperature condition of the resulting water-based pigment dispersion or water-based ink, the value of the condition 2 is further even more preferably not less than 80 mgKOH/g, whereas from the viewpoint of improving fixing properties of the resulting water-based pigment dispersion or water-based ink, the value of the condition 2 is even more preferably not more than 100 mgKOH/g and further even more preferably not more than 90 mgKOH/g.

[Condition 3]

The condition 3 is such a requirement that a value calculated according to the formula:

[(crosslinking degree)/100]×(acid value of carboxy group-containing water-insoluble polymer), is preferably not less than 40 mgKOH/g and not more than 130 mgKOH/g.

Meanwhile, the crosslinking degree is the value calculated by dividing a mole number of the epoxy groups of the water-insoluble polyfunctional epoxy compound used by a mole number of the carboxy groups of the water-insoluble polymer, and is represented in terms of an acid value per 1 g of the water-insoluble polymer used for dispersing the pigment.

When the value of the condition 3 is preferably not less than 40 mgKOH/g, more preferably not less than 45 mgKOH/g, even more preferably not less than 50 mgKOH/g and further even more preferably not less than 55 mgKOH/g, the resulting water-based pigment dispersion or water-based ink is capable of ensuring good storage stability without causing any damage to adsorption of the water-insoluble polymer to the pigment. On the other hand, when the value of the condition 3 is preferably not more than 130 mgKOH/g, more preferably not more than 100 mgKOH/g, even more preferably not more than 90 mgKOH/g, further even more preferably not more than 80 mgKOH/g and still further even more preferably not more than 75 mgKOH/g, the resulting water-based pigment dispersion or water-based ink is capable of ensuring excellent water resistance and fixing properties by suppressing brittleness of a film thereof.

The reaction between the water-insoluble polyfunctional epoxy compound and the carboxy groups of the polymer dispersant is preferably carried out after dispersing the pigment in the aqueous medium using the polymer dispersant. From the viewpoint of completion of the reaction and good cost efficiency, the reaction time is preferably not less than 0.5 hour, more preferably not less than 1 hour, even more preferably not less than 1.5 hours and further even more preferably not less than 3.0 hours, and is also preferably not more than 12 hours, more preferably not more than 10 hours, even more preferably not more than 8.0 hours and further even more preferably not more than 5 hours.

In addition, from the same viewpoint as described above, the reaction temperature is preferably not lower than 40° C., more preferably not lower than 50° C., even more preferably not lower than 55° C., further even more preferably not lower than 60° C. and still further even more preferably not lower than 70° C., and is also preferably not higher than 95° C. and more preferably not higher than 90° C.

The crosslinking degree of the water-insoluble polymer crosslinked is preferably not less than 5 mol %, more preferably not less than 10 mol % and even more preferably not less than 15 mol %, and is also preferably not more than 80 mol %, more preferably not more than 70 mol % and even more preferably not more than 60 mol %. The crosslinking degree of the water-insoluble polymer crosslinked is an apparent crosslinking degree calculated from an acid value of the polymer and an equivalent amount of the epoxy groups of the crosslinking agent, i.e., is expressed by the ratio of a mole equivalent number of the epoxy groups of the water-insoluble polyfunctional epoxy compound to a mole equivalent number of the carboxy groups of the water-insoluble polymer [(mole equivalent number of epoxy groups of water-insoluble polyfunctional epoxy compound)/(mole equivalent number of carboxy groups of water-insoluble polymer)].

The water-based pigment dispersion according to the present invention may be compounded with from 1 to 10% by mass of glycerin, triethylene glycol or the like as a humectant for preventing drying of the dispersion. The water-based pigment dispersion may also be compounded with various additives such as mildew-proof agent, etc.

The aforementioned additives may be compounded into the dispersion upon dispersing the pigment therein with the water-insoluble polymer, or after dispersing the pigment or conducting the crosslinking reaction.

[Process for Producing Water-Based Ink]

The process for producing a water-based ink according to the present invention includes the following steps 1 to 4:

Step 1: neutralizing a carboxy group-containing water-insoluble polymer with an alkali metal hydroxide;

Step 2: mixing and dispersing the neutralized water-insoluble polymer obtained in the step 1 and a pigment in an aqueous medium to obtain a pigment water dispersion A;

Step 3: subjecting the pigment water dispersion A obtained in the step 2 to crosslinking treatment with a water-insoluble polyfunctional epoxy compound to obtain a water-based pigment dispersion B containing the crosslinked water-insoluble polymer; and Step 4: mixing the water-based pigment dispersion B obtained in the step 3 with an organic solvent to obtain the water-based ink, said water-based ink satisfying the following conditions 1 and 2 representing a relationship between an acid value and a neutralization degree of the water-insoluble polymer in the step 1 and a crosslinking degree of the water-insoluble polymer in the step 3:

Condition 1: a value calculated according to the formula:

{[100−(neutralization degree)−(crosslinking degree)]/100}×(acid value of carboxy group-containing water-insoluble polymer), being not less than 32 mgKOH/g and not more than 130 mgKOH/g; and Condition 2: a value calculated according to the formula:

[(neutralization degree)/100]×(acid value of carboxy group-containing water-insoluble polymer), being not less than 48 mgKOH/g and not more than 144 mgKOH/g, wherein the neutralization degree means a ratio of a mole equivalent number of the alkali metal hydroxide to a mole equivalent number of the carboxy groups of the water-insoluble polymer [(mole equivalent number of alkali metal hydroxide)/(mole equivalent number of carboxy groups of water-insoluble polymer)], and the crosslinking degree means a ratio of a mole equivalent number of epoxy groups of the water-insoluble polyfunctional epoxy compound to a mole equivalent number of the carboxy groups of the water-insoluble polymer [(mole equivalent number of epoxy groups of water-insoluble polyfunctional epoxy compound)/ (mole equivalent number of carboxy groups of water-insoluble polymer)].

In the step 1, the carboxy group-containing water-insoluble polymer is neutralized with the alkali metal hydroxide, and then in the step 2, the water-insoluble polymer obtained in the step 1 and the pigment are mixed and dispersed in the aqueous medium to obtain the pigment water dispersion A.

The details of the steps 1 to 3 are the same as those of the steps I, II and III described in the aforementioned paragraph [Production of Pigment-Containing Polymer Particles]. Meanwhile, the term "aqueous medium" as used herein means a medium for dispersing the pigment therein in which water has a largest content among whole components contained in the medium.

The details of the conditions 1 and 2 are the same as those described above.

In the step 4, the water-based pigment dispersion B obtained in the step 3 is mixed with the organic solvent to obtain the water-based ink. The method for mixing the water-based pigment dispersion B with the organic solvent is not particularly limited.

The organic solvent is used from the viewpoint of improving storage stability, etc., of the water-based ink. The organic solvent used in the step 4 is preferably constituted of one or more organic solvents having a boiling point of not lower than 90° C., and it is also preferred that a weighted mean value of boiling points of the organic solvents is not higher than 250° C. The weighted mean value of boiling points of the organic solvents is preferably not lower than 150° C. and more preferably not lower than not lower than 180° C., and is also preferably not higher than 240° C., more preferably not higher than 220° C. and even more preferably not higher than 200° C.

Specific examples of the organic solvent used in the step 4 include polyhydric alcohols, polyhydric alcohol alkyl ethers, nitrogen-containing heterocyclic compounds, amides, amines, sulfur-containing compounds, etc. Of these organic solvents, preferred is at least one organic solvent selected from the group consisting of polyhydric alcohols and polyhydric alcohol alkyl ethers, more preferred is at least one organic solvent selected from the group consisting of ethylene glycol, propylene glycol, diethylene glycol, triethylene glycol, polyethylene glycol, glycerin, trimethylol propane and diethylene glycol diethyl ether, and even more preferred is at least one organic solvent selected from the group consisting of glycerin, triethylene glycol and trimethylol propane.

In the process for producing a water-based ink according to the present invention, in addition to the aforementioned components, various additives that may be usually used in the water-based ink, such as a humectant, a wetting agent, a penetrant, a dispersant, a surfactant, a viscosity controller, a defoaming agent, an antiseptic agent, a mildew-proof agent and a rust preventive may be added thereto, if required. Furthermore, the water-based ink may be subjected to filtration treatment using a filter, etc.

The contents of the respective components in the water-based ink obtained by the production process of the present invention as well as properties of the water-based ink produced are as follows.

(Content of Pigment)

The content of the pigment in the water-based ink is preferably not less than 1.0% by mass, more preferably not less than 2.0% by mass and even more preferably not less than 2.5% by mass from the viewpoint of enhancing optical density of the water-based ink. Also, the content of the pigment in the water-based ink is preferably not more than 15.0% by mass, more preferably not more than 10.0% by mass and even more preferably not more than 7.0% by mass from the viewpoint of reducing viscosity of the ink upon volatilizing the solvent therefrom, and improving ejection stability and storage stability of the water-based ink.

(Total Content of Pigment and Water-Insoluble Polymer)

The total content of the pigment and the water-insoluble polymer in the water-based ink is preferably not less than 2.0% by mass, more preferably not less than 2.5% by mass, even more preferably not less than 3.0% by mass and further even more preferably not less than 3.5% by mass, and is also preferably not more than 17.0% by mass, more preferably not more than 12.0% by mass, even more preferably not more than 10.0% by mass, further even more preferably not more than 8.0% by mass and still further even more preferably not more than 6.0% by mass.

[Properties of Water-Based Ink]

The viscosity of the water-based ink as measured at 32° C. is preferably not less than 2.0 mPa·s, more preferably not less than 3.0 mPa·s and even more preferably not less than 5.0 mPa·s, and is also preferably not more than 12 mPa·s, more preferably not more than 9.0 mPa·s and even more preferably not more than 7.0 mPa·s, from the viewpoint of improving storage stability of the water-based ink.

The pH value of the water-based ink is preferably not less than 7.0, more preferably not less than 7.2 and even more preferably not less than 7.5 from the viewpoint of improving storage stability of the water-based ink, and is also preferably not more than 11.0, more preferably not more than 10.0 and even more preferably 9.5 from the viewpoint of improving resistance of members to the water-based ink and suppressing skin irritation.

Meanwhile, the pH value of the water-based ink may be measured by the method described in Examples below.

[Ink-Jet Printing Method]

The water-based ink according to the present invention may be loaded to a conventionally known ink-jet printer to eject droplets of the ink onto a recording medium, thereby printing and recording characters or images, etc., on the recording medium.

The ink-jet printer may be either a thermal-type ink-jet printer or a piezoelectric-type ink-jet printer. The water-based ink according to the present invention is preferably used as a water-based ink for ink-jet printing using the piezoelectric-type ink-jet printer.

Examples of the recording medium usable in the present invention include a high-water absorbing plain paper, a low-water absorbing coated paper and a film. Specific examples of the coated paper include a versatile glossy coated paper, a multi-color foam glossy coated paper, etc. Specific examples of the film include a polyester film, a polyvinyl chloride film, a polypropylene film, a polyethylene film, etc.

With respect to the aforementioned embodiments, the present invention further provides the following aspects relating to the water-based pigment dispersion and the process for producing a water-based ink.

<1> A water-based pigment dispersion including a pigment, a polymer dispersant and an aqueous medium in which the pigment is dispersed in the aqueous medium using the polymer dispersant, the polymer dispersant being a water-insoluble polymer containing carboxy groups that are at least partially neutralized with an alkali metal hydroxide, and having a crosslinked structure obtained by reacting a part of the carboxy groups with a water-insoluble polyfunctional epoxy compound, said water-based pigment dispersion satisfying the following conditions 1 and 2:

Condition 1: a value calculated according to the formula:

{[100−(neutralization degree)−(crosslinking degree)]/100}×(acid value of carboxy group-containing water-insoluble polymer), being not less than 32 mgKOH/g and not more than 130 mgKOH/g: and Condition 2: a value calculated according to the formula:

[(neutralization degree)/100]×(acid value of carboxy group-containing water-insoluble polymer), being not less than 48 mgKOH/g and not more than 144 mgKOH/g, wherein the neutralization degree means a ratio of a mole equivalent number of the alkali metal hydroxide to a mole equivalent number of the carboxy groups of the water-insoluble polymer [(mole equivalent number of alkali metal hydroxide)/(mole equivalent number of carboxy groups of water-insoluble polymer)], and the crosslinking degree means a ratio of a mole equivalent number of epoxy groups of the water-insoluble polyfunctional epoxy compound to a mole equivalent number of the carboxy groups of the water-insoluble polymer [(mole equivalent number of epoxy groups of water-insoluble polyfunctional epoxy compound)/(mole equivalent number of carboxy groups of water-insoluble polymer)].

<2> The water-based pigment dispersion according to the above aspect <1>, wherein the value of {[100−(neutralization degree)−(crosslinking degree)]/100}× (acid value of carboxy group-containing water-insoluble polymer) is preferably not less than 35 mgKOH/g, more preferably not less than 40 mgKOH/g, even more preferably not less than 45 mgKOH/g, further even more preferably not less than 48 mgKOH/g, further even more preferably not less than 55 mgKOH/g and still further even more preferably not less than 65 mgKOH/g, and is also preferably not more than 120 mgKOH/g, more preferably not more than 100 mgKOH/g and even more preferably not more than 90 mgKOH/g.

<3> The water-based pigment dispersion according to the above aspect <1> or <2>, wherein the value of [(neutralization degree)/100]×(acid value of carboxy group-containing water-insoluble polymer) is preferably not less than 60 mgKOH/g, more preferably not less than 65 mgKOH/g, even more preferably not less than 70 mgKOH/g and further even more preferably not less than 80 mgKOH/g, and is also preferably not more than 120 mgKOH/g, more preferably not more than 110 mgKOH/g, even more preferably not more than 100 mgKOH/g and further even more preferably not more than 90 mgKOH/g.

<4> The water-based pigment dispersion according to any one of the above aspects <1> to <3>, wherein the water-based pigment dispersion further satisfies the following condition 3:

Condition 3: a value calculated according to the formula:

[(crosslinking degree)/100]×(acid value of carboxy group-containing water-insoluble polymer), being not less than 40 mgKOH/g and not more than 130 mgKOH/g.

<5> The water-based pigment dispersion according to the above aspect <4>, wherein the value of [(crosslinking degree)/100]×(acid value of carboxy group-containing water-insoluble polymer) is preferably not less than 45 mgKOH/g, more preferably not less than 50 mgKOH/g and even more preferably not less than 55 mgKOH/g, and is also preferably not more than 100 mgKOH/g, more preferably not more than 90 mgKOH/g, even more preferably not more than 80 mgKOH/g and further even more preferably not more than 75 mgKOH/g.

<6> The water-based pigment dispersion according to any one of the above aspects <1> to <5>, wherein the acid value of the carboxy group-containing water-insoluble polymer is preferably not less than 200 mgKOH/g and more preferably not less than 220 mgKOH/g, and is also preferably not more than 320 mgKOH/g, more preferably not more than 300 mgKOH/g and even more preferably not more than 270 mgKOH/g.

<7> The water-based pigment dispersion according to any one of the above aspects <1> to <6>, wherein the carboxy group-containing water-insoluble polymer is at least one polymer selected from the group consisting of polyesters, polyethers and vinyl-based polymers, and more preferably at least one polymer selected from the group consisting of vinyl-based polymers obtained by addition-polymerizing a vinyl monomer selected from a vinyl compound, a vinylidene compound, a vinylene compound and the like.

<8> The water-based pigment dispersion according to the above aspect <7>, wherein the vinyl-based polymer is preferably a vinyl-based polymer containing a constitutional unit derived from (a) a carboxy group-containing monomer and a constitutional unit derived from (b) a hydrophobic monomer, and more preferably the vinyl-based polymer further containing a constitutional unit derived from (c) a macromonomer.

<9> The water-based pigment dispersion according to the above aspect <7> or <8>, wherein the vinyl-based polymer preferably further contains a constitutional unit derived from (d) a nonionic monomer.

<10> The water-based pigment dispersion according to any one of the above aspects <1> to <9>, wherein the carboxy group-containing water-insoluble polymer is a vinyl-based polymer containing a constitutional unit derived from at least one carboxy group-containing monomer selected from the group consisting of acrylic acid and methacrylic acid, and a constitutional unit derived from at least one hydrophobic monomer selected from the group consisting of an acrylate monomer, a methacrylate monomer and an aromatic group-containing monomer which contain an alkyl group having not less than 1 and not more than 22 carbon atoms or an aryl group having not less than 6 and not more than 22 carbon atoms.

<11> The water-based pigment dispersion according to any one of the above aspects <8> to <10>, wherein a content of the constitutional unit derived from the carboxy group-containing monomer (a) in the water-insoluble polymer is preferably not less than 10% by mass, more preferably not less than 20% by mass and even more preferably not less than 25% by mass, and is also preferably less than 75% by mass, more preferably less than 60% by mass and even more preferably less than 55% by mass.

<12> The water-based pigment dispersion according to any one of the above aspects <8> to <11>, wherein a content of the constitutional unit derived from the hydrophobic monomer (b) in the water-insoluble polymer is preferably not less than 35% by mass, more preferably not less than 40% by mass and even more preferably not less than 45% by mass, and is also preferably less than 90% by mass, more preferably less than 80% by mass and even more preferably less than 75% by mass.

<13> The water-based pigment dispersion according to any one of the above aspects <8> to <12>, wherein in the case where the water-insoluble polymer further contains the constitutional unit derived from the macromonomer (c) and/or the constitutional unit derived from the nonionic monomer (d), a content of the constitutional unit derived from the carboxy group-containing monomer (a) in the water-insoluble polymer is preferably not less than 3% by mass, more preferably not less than 5% by mass and even more preferably not less than 7% by mass, and is also preferably not more than 30% by mass, more preferably not more than 28% by mass and even more preferably not more than 25% by mass.

<14> The water-based pigment dispersion according to any one of the above aspects <8> to <13>, wherein in the case where the water-insoluble polymer further contains the constitutional unit derived from the macromonomer (c) and/or the constitutional unit derived from the nonionic monomer (d), a content of the constitutional unit derived from the hydrophobic monomer (b) in the water-insoluble polymer is preferably not less than 25% by mass, more preferably not less than 30% by mass and even more preferably not less than 35% by mass, and is also preferably not more than 60% by mass, more preferably not more than 55% by mass and even more preferably not more than 50% by mass.

<15> The water-based pigment dispersion according to any one of the above aspects <8> to <14>, wherein in the case where the water-insoluble polymer further contains the constitutional unit derived from the macromonomer (c), a content of the constitutional unit derived from the component (c) in the water-insoluble polymer is preferably not less than 3% by mass, more preferably not less than 5% by mass and even more preferably not less than 8% by mass, and is also preferably not more than 30% by mass, more preferably not more than 25% by mass and even more preferably not more than 20% by mass.

<16> The water-based pigment dispersion according to any one of the above aspects <9> to <15>, wherein in the case where the water-insoluble polymer further contains the constitutional unit derived from the nonionic monomer (d), a content of the constitutional unit derived from the component (d) in the water-insoluble polymer is preferably not less than 5% by mass, more preferably not less than 10% by mass and even more preferably not less than 15% by mass, and is also preferably not more than 40% by mass, more preferably not more than 35% by mass and even more preferably not more than 30% by mass.

<17> The water-based pigment dispersion according to any one of the above aspects <1> to <16>, wherein a number-average molecular weight of the water-insoluble polymer is preferably not less than 2,000 and more preferably not less than 5,000, and is also preferably not more than 20,000 and more preferably not more than 18,000.

<18> The water-based pigment dispersion according to any one of the above aspects <1> to <17>, wherein a neutralization degree of the carboxy groups of the water-insoluble polymer is preferably not less than 10 mol %, more preferably not less than 15 mol %, even more preferably not less than 20 mol % and further even more preferably not less than 25 mol %, and is also preferably not more than 60 mol %, more preferably not more than 55 mol %, even more preferably not more than 50 mol % and further even more preferably not more than 45 mol %.

<19> The water-based pigment dispersion according to any one of the above aspects <1> to <18>, wherein the water-insoluble polyfunctional epoxy compound is preferably a compound containing two or more epoxy groups in a molecule thereof, more preferably a glycidyl ether group-containing compound, and even more preferably a glycidyl ether compound of a polyhydric alcohol containing a hydrocarbon group having not less than 3 and not more than 8 carbon atoms.

<20> The water-based pigment dispersion according to any one of the above aspects <1> to <19>, wherein a molecular weight of the water-insoluble polyfunctional epoxy compound is preferably not less than 120, more preferably not less than 150 and even more preferably not less than 200, and is also preferably not more than 2,000, more preferably not more than 1,500 and even more preferably not more than 1,000.

<21> The water-based pigment dispersion according to any one of the above aspects <1> to <20>, wherein the number of epoxy groups of the water-insoluble polyfunctional epoxy compound per a molecule thereof is not less than 2 and preferably not less than 3, and is also preferably not more than 6 and more preferably not more than 4.

<22> The water-based pigment dispersion according to any one of the above aspects <1> to <21>, wherein the water-insoluble polyfunctional epoxy compound is preferably at least one compound selected from the group consisting of polyglycidyl ethers such as polypropylene glycol diglycidyl ether, glycerin polyglycidyl ether, glycerol polyglycidyl ether, polyglycerol polyglycidyl ether, trimethylol propane polyglycidyl ether, sorbitol polyglycidyl ether, pentaerythritol polyglycidyl ether, resorcinol diglycidyl ether, neopentyl glycol diglycidyl ether and hydrogenated bisphenol A-type diglycidyl ether, and more preferably at least one compound selected from the group consisting of trimethylol propane polyglycidyl ether and pentaerythritol polyglycidyl ether.

<23> The water-based pigment dispersion according to any one of the above aspects <1> to <22>, wherein the crosslinking degree of the water-insoluble polymer crosslinked is preferably not less than 5 mol %, more preferably not less than 10 mol % and even more preferably not less than 15 mol %, and is also preferably not more than 80 mol %, more preferably not more than 70 mol % and even more preferably not more than 60 mol %.

<24> The water-based pigment dispersion according to any one of the above aspects <1> to <23>, for use in ink-jet printing.

<25> A process for producing a water-based ink, including the following steps 1 to 4:
Step 1: neutralizing a carboxy group-containing water-insoluble polymer with an alkali metal hydroxide;
Step 2: mixing and dispersing the neutralized water-insoluble polymer obtained in the step 1 and a pigment in an aqueous medium to obtain a pigment water dispersion A;
Step 3: subjecting the pigment water dispersion A obtained in the step 2 to crosslinking treatment with a water-insoluble polyfunctional epoxy compound to obtain a water-based pigment dispersion B including the crosslinked water-insoluble polymer; and
Step 4: mixing the water-based pigment dispersion B obtained in the step 3 with an organic solvent to obtain the water-based ink,
said water-based ink satisfying the following conditions 1 and 2 representing a relationship between an acid value and a neutralization degree of the water-insoluble polymer in the step 1 and a crosslinking degree of the water-insoluble polymer in the step 3:
Condition 1: a value calculated according to the formula:

{[100−(neutralization degree)−(crosslinking degree)]/ 100}×(acid value of carboxy group-containing water-insoluble polymer), being not less than 32 mgKOH/g and not more than 130 mgKOH/g; and
Condition 2: a value calculated according to the formula:

[(neutralization degree)/100]×(acid value of carboxy group-containing water-insoluble polymer), being not less than 48 mgKOH/g and not more than 144 mgKOH/g,
wherein the neutralization degree means a ratio of a mole equivalent number of the alkali metal hydroxide to a mole equivalent number of the carboxy groups of the water-insoluble polymer [(mole equivalent number of alkali metal hydroxide)/(mole equivalent number of carboxy groups of water-insoluble polymer)], and the crosslinking degree means a ratio of a mole equivalent number of epoxy groups of the water-insoluble polyfunctional epoxy compound to a mole equivalent number of the carboxy groups of the water-insoluble polymer [(mole equivalent number of epoxy groups of water-insoluble polyfunctional epoxy compound)/ (mole equivalent number of carboxy groups of water-insoluble polymer)].
<26> The process for producing a water-based ink according to the above aspect <25>, wherein the value of {[100− (neutralization degree)−(crosslinking degree)]/100}×(acid value of carboxy group-containing water-insoluble polymer) is preferably not less than 35 mgKOH/g, more preferably not less than 40 mgKOH/g, even more preferably not less than 45 mgKOH/g, further even more preferably not less than 48 mgKOH/g, further even more preferably not less than 55 mgKOH/g and still further even more preferably not less than 65 mgKOH/g, and is also not more than 130 mgKOH/g, preferably not more than 120 mgKOH/g, more preferably not more than 100 mgKOH/g and even more preferably not more than 90 mgKOH/g.
<27> The process for producing a water-based ink according to the above aspect <25> or <26>, wherein the value of [(neutralization degree)/100]×(acid value of carboxy group-containing water-insoluble polymer) is preferably not less than 60 mgKOH/g, more preferably not less than 65 mgKOH/g, even more preferably not less than 70 mgKOH/g and further even more preferably not less than 80 mgKOH/g, and is also preferably not more than 120 mgKOH/g, more preferably not more than 110 mgKOH/g, even more preferably not more than 100 mgKOH/g and further even more preferably not more than 90 mgKOH/g.
<28> The process for producing a water-based ink according to any one of the above aspects <25> to <27>, wherein the water-based ink further satisfies the following condition 3:
Condition 3: a value calculated according to the formula:

[(crosslinking degree)/100]×(acid value of carboxy group-containing water-insoluble polymer), being not less than 40 mgKOH/g and not more than 130 mgKOH/g.
<29> The process for producing a water-based ink according to the above aspect <28>, wherein the value of [(crosslinking degree)/100]×(acid value of carboxy group-containing water-insoluble polymer) is preferably not less than 45 mgKOH/g, more preferably not less than 50 mgKOH/g and even more preferably not less than 55 mgKOH/g, and is also preferably not more than 100 mgKOH/g, more preferably not more than 90 mgKOH/g, even more preferably not more than 80 mgKOH/g and further even more preferably not more than 75 mgKOH/g.
<30> The process for producing a water-based ink according to any one of the above aspects <25> to <29>, wherein the acid value of the water-insoluble polymer in the step 1 is preferably not less than 200 mgKOH/g and more preferably not less than 220 mgKOH/g, and is also preferably not more than 320 mgKOH/g, more preferably not more than 300 mgKOH/g and even more preferably not more than 270 mgKOH/g.
<31> The process for producing a water-based ink according to any one of the above aspects <25> to <30>, wherein the neutralization degree of the carboxy groups of the water-insoluble polymer in the step 1 is preferably not less than 10 mol %, more preferably not less than 15 mol %, even more preferably not less than 20 mol % and further even more preferably not less than 25 mol %, and is also preferably not more than 60 mol %, more preferably not more than 55 mol %, even more preferably not more than 50 mol % and further even more preferably not more than 45 mol %.
<32> The process for producing a water-based ink according to any one of the above aspects <25> to <31>, wherein the crosslinking degree of the water-insoluble polymer cross-linked in the step 3 is preferably not less than 5 mol %, more preferably not less than 10 mol % and even more preferably not less than 15 mol %, and is also preferably not more than 80 mol %, more preferably not more than 70 mol % and even more preferably not more than 60 mol %.
<33> A use of the water-based pigment dispersion according to any one of the above aspects <1> to <23> for a water-based ink.
<34> A use of the water-based pigment dispersion according to any one of the above aspects <1> to <23> for a water-based ink for ink-jet printing.

EXAMPLES

In the following Production Examples, Examples and Comparative Examples, etc., the "part(s)" and "%" indicate "part(s) by mass" and "% by mass", respectively, unless otherwise specified.
(1) Measurement of Number-Average Molecular Weight of Water-Insoluble Polymer The number-average molecular weight of the water-insoluble polymer was measured by gel chromatographic method [GPC apparatus: "HLC-8120GPC" available from Tosoh Corporation; column: "TSK-GEL, α-M"×2; available from Tosoh Corporation; flow rate: 1 mL/min] using N,N-dimethyl formamide (for high-performance liquid chromatography) available from Wako Pure Chemical Industries, Ltd., in which phosphoric acid (guaranteed reagent) available from Wako Pure Chemical Industries, Ltd., and lithium bromide (reagent) available from Tokyo Chemical Industry Co., Ltd., were dissolved in amounts of 60 mmol/L and 50 mmol/L, respectively, as an eluent, and using a monodisperse polystyrene having a known molecular weight as a reference standard substance.
(2) Measurement of Average Particle Sizes of Water-Insoluble Polymer Particles and Pigment-Containing Polymer Particles The particles were subjected to cumulant analysis using a laser particle analyzing system "ELS-8000" available from Otsuka Electrics Co., Ltd., to measure an average particle size thereof. The measurement was conducted under the conditions including a temperature of 25° C., an angle between incident light and detector of 90° and a cumulative number of 100 times, and a refractive index of water (1.333) was input to the analyzing system as a refractive index of the dispersing medium. Further, the measurement was conducted by diluting the dispersion with water so as to adjust a concentration of the dispersion to be measured to $5 \times 10^{-3}\%$ by mass in terms of a solid content thereof.

(3) Measurement of Solid Content of Pigment Water Dispersion

Sodium sulfate dried to constant weight in a desiccator was weighed in an amount of 10.0 g and charged in a 30 mL polypropylene vessel ($\phi$: 40 mm; height: 30 mm), and about 1.0 g of a sample was added to the vessel. The contents of the vessel were mixed and then accurately weighed. The resulting mixture was maintained in the vessel at 105° C. for 2 hours to remove volatile components therefrom and further allowed to stand in a desiccator for 15 minutes to measure a mass thereof. The mass of the sample thus measured after removing the volatile components therefrom was regarded as a mass of solid components therein. The solid content of the sample was calculated by dividing the mass of the solid components by the mass of the sample initially charged.

(4) Measurement of Water Solubility Rate of Epoxy Compound

A glass tube (25 mm$\phi$ in diameter×250 mm in height) was charged with 90 parts by mass of ion-exchanged water and 10 parts by mass of a crosslinking agent at room temperature (25° C.). The glass tube thus charged was allowed to stand for 1 hour in a thermostatic bath controlled to a water temperature of 25° C. Next, the contents of the glass tube were vigorously shaken for 1 minute, and the glass tube was placed again in the thermostatic bath, followed by allowing the glass tube to stand in the bath for 10 minutes. Then, the mass of undissolved components in the contents of the glass tube was measured to calculate a water solubility rate (% by mass) of the epoxy compound as the crosslinking agent.

<Preparation of Polymer Dispersant>

Preparation Example 1

Forty six (46) parts of methacrylic acid (reagent) available from Wako Pure Chemical Industries, Ltd., 94 parts of styrene (reagent) available from Wako Pure Chemical Industries, Ltd., 40 parts of a styrene macromer "AS-6 S" (tradename; number-average molecular weight: 6,000; solid content: 50%; 20 parts as an amount of solid components) available from Toagosei Co., Ltd., and 40 parts of polypropylene glycol monomethacrylate "BLEMMER PP-800" (tradename; average molar number of addition of propyleneoxide: 13; end group: hydroxy group) available from NOF Corporation were mixed to prepare a monomer mixture solution. Twenty (20) parts of methyl ethyl ketone (MEK) and 0.3 part of 2-mercaptoethanol as a chain transfer agent as well as 10% of the monomer mixture solution prepared above were charged into a reaction vessel and mixed with each other, and then an inside atmosphere of the reaction vessel was fully replaced with a nitrogen gas.

Separately, a mixed solution prepared by mixing remaining 90% of the monomer mixture solution, 0.27 part of the aforementioned chain transfer agent, 60 parts of MEK and 2.2 parts of an azo-based radical polymerization initiator "V-65" (tradename; 2,2'-azobis(2,4-dimethylvaleronitrile)) available from Wako Pure Chemical Industries, Ltd., was charged into a dropping funnel. In a nitrogen atmosphere, the mixed solution in the reaction vessel was heated to 65° C. while stirring, and then the mixed solution in the dropping funnel was added dropwise thereinto over 3 hours. After the elapse of 2 hours from completion of the dropwise addition while maintaining the resulting mixed solution at a temperature of 65° C., a solution prepared by dissolving 0.3 part of the aforementioned polymerization initiator in 5 parts of MEK was added to the mixed solution, and the resulting reaction solution was further aged at 65° C. for 2 hours and then at 70° C. for 2 hours to thereby obtain a carboxy group-containing polymer solution (a) (number-average molecular weight of the polymer: 11,000).

Preparation Example 2

Seventy four (74) parts of methacrylic acid available from Wako Pure Chemical Industries, Ltd., 66 parts of styrene available from Wako Pure Chemical Industries, Ltd., 40 parts of the aforementioned styrene macromer "AS-6S" (20 parts as an amount of solid components) and 40 parts of the aforementioned polypropylene glycol monomethacrylate "BLEMMER PP-800" were mixed to prepare a monomer mixture solution. Twenty (20) parts of MEK and 0.3 part of 2-mercaptoethanol as a chain transfer agent as well as 10% of the monomer mixture solution prepared above were charged into a reaction vessel and mixed with each other, and then an inside atmosphere of the reaction vessel was fully replaced with a nitrogen gas.

Separately, a mixed solution prepared by mixing remaining 90% of the monomer mixture solution, 0.27 part of the aforementioned chain transfer agent, 60 parts of MEK and 2.2 parts of an azo-based radical polymerization initiator "V-65" was charged into a dropping funnel. The subsequent procedure was conducted in the same manner as in Preparation Example 1, thereby obtaining a carboxy group-containing polymer solution (b) (number-average molecular weight of the polymer: 12,000).

Preparation Example 3

One hundred fourteen (114) parts of methacrylic acid available from Wako Pure Chemical Industries, Ltd., 26 parts of styrene available from Wako Pure Chemical Industries, Ltd., 40 parts of the aforementioned styrene macromer "AS-6S" (20 parts as an amount of solid components) and 40 parts of the aforementioned polypropylene glycol monomethacrylate "BLEMMER PP-800" were mixed to prepare a monomer mixture solution. Twenty (20) parts of MEK and 0.3 part of 2-mercaptoethanol as a chain transfer agent as well as 10% of the monomer mixture solution prepared above were charged into a reaction vessel and mixed with each other, and then an inside atmosphere of the reaction vessel was fully replaced with a nitrogen gas.

Separately, a mixed solution prepared by mixing remaining 90% of the monomer mixture solution, 0.27 part of the aforementioned chain transfer agent, 60 parts of MEK and 2.2 parts of an azo-based radical polymerization initiator "V-65" was charged into a dropping funnel. The subsequent procedure was conducted in the same manner as in Preparation Example 1, thereby obtaining a carboxy group-containing polymer solution (c) (number-average molecular weight of the polymer: 12,500).

Preparation Example 4

Thirty nine (39) parts of acrylic acid (reagent) available from Wako Pure Chemical Industries, Ltd., 151 parts of styrene available from Wako Pure Chemical Industries, Ltd., and 10 parts of α-methyl styrene (reagent) available from Wako Pure Chemical Industries, Ltd., were mixed to prepare a monomer mixture solution. Twenty (20) parts of MEK and 0.3 part of 2-mercaptoethanol as a chain transfer agent as well as 10% of the monomer mixture solution prepared above were charged into a reaction vessel and mixed with each other, and then an inside atmosphere of the reaction vessel was fully replaced with a nitrogen gas.

Separately, a mixed solution prepared by mixing remaining 90% of the monomer mixture solution, 0.27 part of the aforementioned chain transfer agent, 60 parts of MEK and 2.2 parts of an azo-based radical polymerization initiator "V-65" was charged into a dropping funnel. The subsequent procedure was conducted in the same manner as in Preparation Example 1, thereby obtaining a carboxy group-containing polymer solution (d) (number-average molecular weight of the polymer: 11,000).

Preparation Example 5

Fifty five (55) parts of acrylic acid available from Wako Pure Chemical Industries, Ltd., 136 parts of styrene available from Wako Pure Chemical Industries, Ltd., and 9 parts of α-methyl styrene available from Wako Pure Chemical Industries, Ltd., were mixed to prepare a monomer mixture solution. Twenty (20) parts of MEK and 0.3 part of 2-mercaptoethanol as a chain transfer agent as well as 10% of the monomer mixture solution prepared above were charged into a reaction vessel and mixed with each other, and then an inside atmosphere of the reaction vessel was fully replaced with a nitrogen gas.

Separately, a mixed solution prepared by mixing remaining 90% of the monomer mixture solution, 0.27 part of the aforementioned chain transfer agent, 60 parts of MEK and 2.2 parts of an azo-based radical polymerization initiator "V-65" was charged into a dropping funnel. The subsequent procedure was conducted in the same manner as in Preparation Example 1, thereby obtaining a carboxy group-containing polymer solution (e) (number-average molecular weight of the polymer: 12,500).

Preparation Example 6

Sixty two (62) parts of acrylic acid available from Wako Pure Chemical Industries, Ltd., 129 parts of styrene available from Wako Pure Chemical Industries, Ltd., and 9 parts of α-methyl styrene (reagent) available from Wako Pure Chemical Industries, Ltd., were mixed to prepare a monomer mixture solution. Twenty (20) parts of MEK and 0.3 part of 2-mercaptoethanol as a chain transfer agent as well as 10% of the monomer mixture solution prepared above were charged into a reaction vessel and mixed with each other, and then an inside atmosphere of the reaction vessel was fully replaced with a nitrogen gas.

Separately, a mixed solution prepared by mixing remaining 90% of the monomer mixture solution, 0.27 part of the aforementioned chain transfer agent, 60 parts of MEK and 2.2 parts of an azo-based radical polymerization initiator "V-65" was charged into a dropping funnel. The subsequent procedure was conducted in the same manner as in Preparation Example 1, thereby obtaining a carboxy group-containing polymer solution (f) (number-average molecular weight of the polymer: 12,500).

Preparation Example 7

Seventy seven (77) parts of acrylic acid available from Wako Pure Chemical Industries, Ltd., 114 parts of styrene available from Wako Pure Chemical Industries, Ltd., and 9 parts of α-methyl styrene (reagent) available from Wako Pure Chemical Industries, Ltd., were mixed to prepare a monomer mixture solution. Twenty (20) parts of MEK and 0.3 part of 2-mercaptoethanol as a chain transfer agent as well as 10% of the monomer mixture solution prepared above were charged into a reaction vessel and mixed with each other, and then an inside atmosphere of the reaction vessel was fully replaced with a nitrogen gas.

Separately, a mixed solution prepared by mixing remaining 90% of the monomer mixture solution, 0.27 part of the aforementioned chain transfer agent, 60 parts of MEK and 2.2 parts of an azo-based radical polymerization initiator "V-65" was charged into a dropping funnel. The subsequent procedure was conducted in the same manner as in Preparation Example 1, thereby obtaining a carboxy group-containing polymer solution (g) (number average molecular weight of the polymer: 13,500).

Preparation Example 8

Ninety five (95) parts of acrylic acid available from Wako Pure Chemical Industries, Ltd., 96 parts of styrene available from Wako Pure Chemical Industries, Ltd., and 9 parts of α-methyl styrene available from Wako Pure Chemical Industries, Ltd., were mixed to prepare a monomer mixture solution. Twenty (20) parts of MEK and 0.3 part of 2-mercaptoethanol as a chain transfer agent as well as 10% of the monomer mixture solution prepared above were charged into a reaction vessel and mixed with each other, and then an inside atmosphere of the reaction vessel was fully replaced with a nitrogen gas.

Separately, a mixed solution prepared by mixing remaining 90% of the monomer mixture solution, 0.27 part of the aforementioned chain transfer agent, 60 parts of MEK and 2.2 parts of an azo-based radical polymerization initiator "V-65" was charged into a dropping funnel. The subsequent procedure was conducted in the same manner as in Preparation Example 1, thereby obtaining a carboxy group-containing polymer solution (h) (number-average molecular weight of the polymer: 13,500).

Preparation Example 9

Seventy four (74) parts of methacrylic acid available from Wako Pure Chemical Industries, Ltd., 66 parts of benzyl methacrylate (reagent) available from Wako Pure Chemical Industries, Ltd., 40 parts of the aforementioned styrene macromer "AS-6S" (20 parts as an amount of solid components) and 40 parts of the aforementioned polypropylene glycol monomethacrylate "BLEMMER PP-800" were mixed to prepare a monomer mixture solution. Twenty (20) parts of MEK and 0.3 part of 2-mercaptoethanol as a chain transfer agent as well as 10% of the monomer mixture solution prepared above were charged into a reaction vessel and mixed with each other, and then an inside atmosphere of the reaction vessel was fully replaced with a nitrogen gas.

Separately, a mixed solution prepared by mixing remaining 90% of the monomer mixture solution, 0.27 part of the aforementioned chain transfer agent, 60 parts of MEK and 2.2 parts of an azo-based radical polymerization initiator "V-65" was charged into a dropping funnel. The subsequent procedure was conducted in the same manner as in Preparation Example 1, thereby obtaining a carboxy group-containing polymer solution (i) (number-average molecular weight of the polymer: 13,500).

Preparation Example 10

One hundred fourteen (114) parts of methacrylic acid available from Wako Pure Chemical Industries, Ltd., 26 parts of benzyl methacrylate available from Wako Pure Chemical Industries, Ltd., 40 parts of the aforementioned styrene macromer "AS-6S" (20 parts as an amount of solid components) and 40 parts of the aforementioned polypropylene glycol monomethacrylate "BLEMMER PP-800" were mixed to prepare a monomer mixture solution. Twenty (20) parts of MEK and 0.3 part of 2-mercaptoethanol as a chain transfer agent as well as 10% of the monomer mixture solution prepared above were charged into a reaction vessel and mixed with each other, and then an inside atmosphere of the reaction vessel was fully replaced with a nitrogen gas.

Separately, a mixed solution prepared by mixing remaining 90% of the monomer mixture solution, 0.27 part of the aforementioned chain transfer agent, 60 parts of MEK and 2.2 parts of an azo-based radical polymerization initiator "V-65" was charged into a dropping funnel. The subsequent procedure was conducted in the same manner as in Preparation Example 1, thereby obtaining a carboxy group-containing polymer solution (j) (number-average molecular weight of the polymer: 14,500).

<Production of Pigment Water Dispersion>

Production Example 1

Twenty five (25) parts of the polymer produced by drying the polymer solution obtained in Preparation Example 1 under reduced pressure was mixed in 78.6 parts of MEK. Then, 6.3 parts of a 5N sodium hydroxide aqueous solution (sodium hydroxide solid content: 16.9%; for volumetric titration) available from Wako Pure Chemical Industries, Ltd., was added into the resulting mixed solution to neutralize the polymer such that the ratio of the number of moles of sodium hydroxide to the number of moles of carboxy groups of the polymer was 40% (neutralization degree: 40%). Furthermore, 400 parts of ion-exchanged water and then 100 parts of a cyan pigment "TGR-SD" (tradename; C.I. Pigment Blue 15:3) available from DIC Corporation were added to the resulting mixture. The thus obtained mixture was stirred at 20° C. for 60 minutes using a disper "ULTRA DISPER" (tradename) available from Asada Iron Works Co., Ltd., while operating a disper blade thereof at a rotating speed of 7000 rpm.

The resulting mixture was dispersed under a pressure of 200 MPa using "Microfluidizer" (tradename) available from Microfluidics Corporation by passing the mixture through the device 10 times. The obtained dispersion was mixed with 250 parts of ion-exchanged water and stirred together, and then allowed to stand at 60° C. under reduced pressure to completely remove MEK therefrom, followed by further removing a part of water therefrom. The resulting dispersion was subjected to filtration using a 25 mL-capacity needless syringe available from Terumo Corporation fitted with a 5 µm filter (acetyl cellulose membrane; outer diameter: 2.5 cm) available from FUJIFILM Corporation to remove coarse particles therefrom, thereby obtaining a pigment water dispersion 1 having a solid content of 20%.

Production Example 2

The same procedure as in Production Example 1 was repeated except for using 25 parts of a polymer produced by drying the polymer solution obtained in Preparation Example 2 under reduced pressure in place of the polymer solution obtained in Preparation Example 1 as well as using 5.1 parts (neutralization degree: 20%) of the 5N sodium hydroxide aqueous solution (sodium hydroxide solid content: 16.9%; for volumetric titration) available from Wako Pure Chemical Industries, Ltd., in place of 6.3 parts of the 5N sodium hydroxide aqueous solution, thereby obtaining a pigment water dispersion 2.

Production Examples 3 and 4

The same procedure as in Production Example 2 was repeated except for using 7.6 parts (neutralization degree: 30%) or 10.1 parts (neutralization degree: 40%) of the 5N sodium hydroxide aqueous solution in place of 5.1 parts of the 5N sodium hydroxide aqueous solution, thereby obtaining pigment water dispersions 3 and 4.

Production Example 5

The same procedure as in Production Example 4 was repeated except for using 10.1 parts (neutralization degree: 40%) of a 5N potassium hydroxide aqueous solution (potassium hydroxide solid content: 23.1%; for volumetric titration) available from Wako Pure Chemical Industries, Ltd., in place of 10.1 parts of the 5N sodium hydroxide aqueous solution, thereby obtaining a pigment water dispersion 5.

Production Example 6

The same procedure as in Production Example 2 was repeated except for using 4.3 parts (neutralization degree: 40%) of triethyl amine in place of 5.1 parts of the 5N sodium hydroxide aqueous solution, thereby obtaining a pigment water dispersion 6.

Production Examples 7 to 9

The same procedure as in Production Example 2 was repeated except for using 12.7 parts (neutralization degree: 50%), 15.2 parts (neutralization degree: 60%) or 25.4 parts (neutralization degree: 100%) of the 5N sodium hydroxide aqueous solution in place of 5.1 parts of the 5N sodium hydroxide aqueous solution, thereby obtaining pigment water dispersions 7 to 9.

Production Example 10

The same procedure as in Production Example 6 was repeated except for using 10.8 parts (neutralization degree: 100%) of triethyl amine in place of 4.3 parts of triethyl amine, thereby obtaining a pigment water dispersion 10.

Production Example 11

The same procedure as in Production Example 1 was repeated except for using 25 parts of a polymer produced by drying the polymer solution obtained in Preparation Example 3 under reduced pressure in place of the polymer solution obtained in Preparation Example 1 as well as using 15.6 parts (neutralization degree: 40%) of the 5N sodium hydroxide aqueous solution, thereby obtaining a pigment water dispersion 11.

Production Example 12

The same procedure as in Production Example 1 was repeated except for using 25 parts of a polymer produced by drying the polymer solution obtained in Preparation Example 4 under reduced pressure in place of the polymer solution obtained in Preparation Example 1, thereby obtaining a pigment water dispersion 12.

Production Example 13

The same procedure as in Production Example 12 was repeated except for using 25 parts of a polymer produced by drying the polymer solution obtained in Preparation Example 5 under reduced pressure in place of the polymer solution obtained in Preparation Example 4 as well as using 9.0 parts (neutralization degree: 40%) of the 5N sodium hydroxide aqueous solution, thereby obtaining a pigment water dispersion 13.

Production Example 14

The same procedure as in Production Example 12 was repeated except for using 25 parts of a polymer produced by drying the polymer solution obtained in Preparation Example 6 under reduced pressure in place of the polymer solution obtained in Preparation Example 4 as well as using 10.1 parts (neutralization degree: 40%) of the 5N sodium hydroxide aqueous solution, thereby obtaining a pigment water dispersion 14.

Production Example 15

The same procedure as in Production Example 12 was repeated except for using 25 parts of a polymer produced by drying the polymer solution obtained in Preparation Example 7 under reduced pressure in place of the polymer solution obtained in Preparation Example 4 as well as using 12.7 parts (neutralization degree: 40%) of the 5N sodium hydroxide aqueous solution, thereby obtaining a pigment water dispersion 15.

Production Example 16

The same procedure as in Production Example 12 was repeated except for using 25 parts of a polymer produced by drying the polymer solution obtained in Preparation Example 8 under reduced pressure in place of the polymer solution obtained in Preparation Example 4 as well as using 15.6 parts (neutralization degree: 40%) of the 5N sodium hydroxide aqueous solution, thereby obtaining a pigment water dispersion 16.

Production Example 17

The same procedure as in Production Example 1 was repeated except for using 25 parts of a polymer produced by drying the polymer solution obtained in Preparation Example 10 under reduced pressure in place of the polymer solution obtained in Preparation Example 1 as well as using 10.2 parts (neutralization degree: 40%) of a 5N potassium hydroxide aqueous solution (for volumetric titration) available from Wako Pure Chemical Industries, Ltd., in place of 6.3 parts of the 5N sodium hydroxide aqueous solution, thereby obtaining a pigment water dispersion 17.

Production Example 18

The same procedure as in Production Example 1 was repeated except for using 100 parts of a carbon black pigment "Monarch 880" available from Cabot Specialty Chemicals Inc., in place of 100 parts of the cyan pigment, thereby obtaining a pigment water dispersion 18.

<Production of Water-Based Pigment Dispersion>

Example 1

One hundred (100) parts of the pigment water dispersion 2 obtained in Production Example 2 (solid content: 20%) was filled in a screw-neck glass bottle, and 0.72 part of trimethylol propane polyglycidyl ether "DENACOL EX-321" (molecular weight: 302; epoxy value: 140; water solubility rate: 27%) as a crosslinking agent containing three epoxy groups in a molecule thereof available from Nagase ChemteX Corporation was added to the bottle, followed by hermetically sealing the bottle with a screw cap. The contents of the bottle were heated at 70° C. for 5 hours while stirring with a stirrer. After the elapse of 5 hours, the contents of the bottle were cooled to room temperature, and then subjected to filtration using a 25 mL-capacity needless syringe available from Terumo Corporation fitted with a 5 μm filter (acetyl cellulose membrane; outer diameter: 2.5 cm) available from FUJIFILM Corporation, thereby obtaining a water-based pigment dispersion 1.

Example 2

One hundred (100) parts of the pigment water dispersion 3 obtained in Production Example 3 (solid content: 20%) was filled in a screw-neck glass bottle, and 0.72 part of the aforementioned "DENACOL EX-321" as a crosslinking agent was added to the bottle, followed by hermetically sealing the bottle with a screw cap. The contents of the bottle were heated at 70° C. for 5 hours while stirring with a stirrer. After the elapse of 5 hours, the contents of the bottle were cooled to room temperature, and then subjected to filtration in the same manner as in Example 1, thereby obtaining a water-based pigment dispersion 2.

Example 3

The same procedure as in Example 2 was repeated except for using 0.96 part of the aforementioned "DENACOL EX-321" as a crosslinking agent in place of 0.72 part of the crosslinking agent, thereby obtaining a water-based pigment dispersion 3.

Example 4

The same procedure as in Example 2 was repeated except for using 1.20 parts of the aforementioned "DENACOL EX-321" as a crosslinking agent in place of 0.72 part of the crosslinking agent, thereby obtaining a water-based pigment dispersion 4.

Example 5

One hundred (100) parts of the pigment water dispersion 4 obtained in Production Example 4 (solid content: 20%) was filled in a screw-neck glass bottle, and 0.48 part of the aforementioned "DENACOL EX-321" as a crosslinking agent was added to the bottle, followed by hermetically sealing the bottle with a screw cap. The contents of the bottle were heated at 70° C. for 5 hours while stirring with a stirrer. After the elapse of 5 hours, the contents of the bottle were cooled to room temperature, and then subjected to filtration in the same manner as in Example 1, thereby obtaining a water-based pigment dispersion 5.

Example 6

The same procedure as in Example 5 was repeated except for using 0.60 part of the aforementioned "DENACOL EX-321" in place of 0.48 part thereof, thereby obtaining a water-based pigment dispersion 6.

Example 7

One hundred (100) parts of the pigment water dispersion 5 obtained in Production Example 5 (solid content: 20%) was filled in a screw-neck glass bottle, and 0.6 part of the aforementioned "DENACOL EX-321" was added to the bottle, followed by hermetically sealing the bottle with a screw cap. The contents of the bottle were heated at 70° C. for 5 hours while stirring with a stirrer. After the elapse of 5 hours, the contents of the bottle were cooled to room temperature, and then subjected to filtration in the same manner as in Example 1, thereby obtaining a water-based pigment dispersion 7.

Example 8

The same procedure as in Example 5 was repeated except for using 0.98 part of pentaerythritol tetraglycidyl ether "DENACOL EX-411" (epoxy value: 229; water-insoluble) available from Nagase ChemteX Corporation in place of 0.48 part of the aforementioned "DENACOL EX-321", thereby obtaining a water-based pigment dispersion 8.

Examples 9 and 10

The same procedure as in Example 5 was repeated except for using 0.84 part or 0.96 part of the aforementioned "DENACOL EX-321" in place of 0.48 part thereof, thereby obtaining water-based pigment dispersions 9 and 10.

Example 11

One hundred (100) parts of the pigment water dispersion 7 obtained in Production Example 7 (solid content: 20%) was filled in a screw-neck glass bottle, and 0.84 part of the aforementioned "DENACOL EX-321" was added to the bottle, followed by hermetically sealing the bottle with a screw cap. The contents of the bottle were heated at 70° C. for 5 hours while stirring with a stirrer. Thereafter, the contents of the bottle were subjected to filtration in the same manner as in Example 1, thereby obtaining a water-based pigment dispersion 11.

Comparative Example 1

One hundred (100) parts of the pigment water dispersion 1 obtained in Production Example 1 (solid content: 20%) was filled in a screw-neck glass bottle, and 0.60 part of the aforementioned "DENACOL EX-321" was added to the bottle, followed by hermetically sealing the bottle with a screw cap. The contents of the bottle were heated at 70° C. for 5 hours while stirring with a stirrer. Thereafter, the contents of the bottle were subjected to filtration in the same manner as in Example 1, thereby obtaining a comparative water-based pigment dispersion 1.

Comparative Example 2

One hundred (100) parts of the pigment water dispersion 4 obtained in Production Example 4 (solid content: 20%) was filled in a screw-neck glass bottle, and 0.78 part of polyglycerol polyglycidyl ether "DENACOL EX-521" (epoxy value: 183; water solubility rate: 100%) as a crosslinking agent available from Nagase ChemteX Corporation was added to the bottle, followed by hermetically sealing the bottle with a screw cap. The contents of the bottle were heated at 70° C. for 5 hours while stirring with a stirrer. Thereafter, the contents of the bottle were subjected to filtration in the same manner as in Example 1, thereby obtaining a comparative water-based pigment dispersion 2.

Comparative Example 3

One hundred (100) parts of the pigment water dispersion 6 obtained in Production Example 6 (solid content: 20%) was filled in a screw-neck glass bottle, and 0.60 part of the aforementioned "DENACOL EX-321" was added to the bottle, followed by hermetically sealing the bottle with a screw cap. The contents of the bottle were heated at 70° C. for 5 hours while stirring with a stirrer. Thereafter, the contents of the bottle were subjected to filtration in the same manner as in Example 1, thereby obtaining a comparative water-based pigment dispersion 3.

Comparative Example 4

One hundred (100) parts of the pigment water dispersion 7 obtained in Production Example 7 (solid content: 20%) was filled in a screw-neck glass bottle, and 0.96 part of the aforementioned "DENACOL EX-321" was added to the bottle, followed by hermetically sealing the bottle with a screw cap. The contents of the bottle were heated at 70° C. for 5 hours while stirring with a stirrer. Thereafter, the contents of the bottle were subjected to filtration in the same manner as in Example 1, thereby obtaining a comparative water-based pigment dispersion 4.

Comparative Example 5

One hundred (100) parts of the pigment water dispersion 8 obtained in Production Example 8 (solid content: 20%) was filled in a screw-neck glass bottle, and 0.72 part of the aforementioned "DENACOL EX-321" was added to the bottle, followed by hermetically sealing the bottle with a screw cap. The contents of the bottle were heated at 70° C. for 5 hours while stirring with a stirrer. Thereafter, the contents of the bottle were subjected to filtration in the same manner as in Example 1, thereby obtaining a comparative water-based pigment dispersion 5.

Comparative Example 6

One hundred (100) parts of the pigment water dispersion 9 obtained in Production Example 9 (solid content: 20%) was filled in a screw-neck glass bottle, and 0.72 part of the aforementioned "DENACOL EX-321" was added to the bottle, followed by hermetically sealing the bottle with a screw cap. The contents of the bottle were heated at 70° C. for 5 hours while stirring with a stirrer. Thereafter, the contents of the bottle were subjected to filtration in the same manner as in Example 1, thereby obtaining a comparative water-based pigment dispersion 6.

Comparative Example 7

One hundred (100) parts of the pigment water dispersion 10 obtained in Production Example 10 (solid content: 20%)

was filled in a screw-neck glass bottle, and 0.72 part of the aforementioned "DENACOL EX-321" was added to the bottle, followed by hermetically sealing the bottle with a screw cap. The contents of the bottle were heated at 70° C. for 5 hours while stirring with a stirrer. Thereafter, the contents of the bottle were subjected to filtration in the same manner as in Example 1, thereby obtaining a comparative water-based pigment dispersion 7.

Comparative Example 8

One hundred (100) parts of the pigment water dispersion 11 obtained in Production Example 11 (solid content: 20%) was filled in a screw-neck glass bottle, and 0.96 part of the aforementioned "DENACOL EX-321" was added to the bottle, followed by hermetically sealing the bottle with a screw cap. The contents of the bottle were heated at 70° C. for 5 hours while stirring with a stirrer. Thereafter, the contents of the bottle were subjected to filtration in the same manner as in Example 1, thereby obtaining a comparative water-based pigment dispersion 8.

Comparative Example 9

One hundred (100) parts of the pigment water dispersion 12 obtained in Production Example 12 (solid content: 20%) was filled in a screw-neck glass bottle, and 0.45 part of the aforementioned "DENACOL EX-321" was added to the bottle, followed by hermetically sealing the bottle with a screw cap. The contents of the bottle were heated at 70° C. for 5 hours while stirring with a stirrer. Thereafter, the contents of the bottle were subjected to filtration in the same manner as in Example 1, thereby obtaining a comparative water-based pigment dispersion 9.

<Evaluation Tests for Water-Based Ink>
(Preparation of Water-Based Ink)

The respective water-based pigment dispersions obtained in the Examples and Comparative Examples were used to prepare a mixture containing the pigment, glycerin (concentrated glycerin for cosmetics) available from Kao Corporation, triethylene glycol (reagent) available from Wako Pure Chemical Industries, Ltd., and "ACETYLENOL E100" (adduct of 2,4,7,9-tetramethyl-5-decyne-4,7-diol with 10 moles of ethyleneoxide) available from Kawaken Fine Chemical Co., Ltd., at concentrations of 5%, 5%, 7% and 0.5%, respectively, on the basis of a whole amount of a water-based ink to be produced, and ion-exchanged water was further added thereto to adjust a whole amount of the resulting dispersion to 100%. The thus obtained dispersion was intimately mixed while stirring using a magnetic stirrer, and then subjected to filtration using a 25 mL-capacity needless syringe fitted with a 1.2 μm filter (acetyl cellulose membrane; outer diameter: 2.5 cm) available from FUJIFILM Corporation, thereby obtaining a water-based ink.

Using the thus obtained water-based ink, the following experiments 1 to 4 were carried out to evaluate the properties of the water-based ink. The results are shown in Tables 1 and 2.

Experiment 1 (Evaluation for Ejection Properties)

The water-based ink obtained above was loaded to an ink-jet printer "Model No.: EM-930C" (piezoelectric type) available from Seiko Epson Corporation, to conduct full solid image printing (Fine mode) on 100 sheets of plain paper. The solid image on the 100th printed sheet was observed to count the number of white lines (white streaks) thereon (corresponding to the number of nozzles from which no ink was ejected). Next, after subjecting the nozzles to cleaning operation, the full solid image printing was further conducted on additional 100 sheets of plain paper, and the solid image on the 100th printed sheet was observed again to count the number of white lines occurred per a width of the ejection nozzle. The ejection properties of the water-based ink was evaluated according to the following ratings.

(Evaluation Ratings)

A: Solid images on both the 100th printed sheet and the 200th printed sheet were free of occurrence of white lines.

B: Occurrence of 2 or less white lines was recognized in the solid images on the 100th printed sheet and the 200th printed sheet.

C: Occurrence of 3 to 5 white lines was recognized in the solid image on the 100th printed sheet or the 200th printed sheet.

D: Occurrence of 6 or more white lines was recognized in the solid image on the 100th printed sheet or the 200th printed sheet.

Experiment 2 (Evaluation for Storage Stability)

The respective water-based inks were filled in a screw vial available from Maruemu Corporation, and the thus filled screw vial was hermetically sealed with a screw cap and allowed to stand in a thermostatic chamber set at each of 20° C. and 60° C. for one week. Then, the average particle size of the water-based ink was measured to calculate a rate of increase in average particle size thereof according to the following formula. The smaller the rate of increase in average particle size of the water-based ink, the smaller amount of particles aggregated and therefore the more excellent the storage stability of the water-based ink.

Rate (%) of increase in average particle size=[(average particle size of ink after storage)−(average particle size of water dispersion used for preparation of ink)/(average particle size of water dispersion used for preparation of ink)]×100

Experiment 3 (Evaluation for Fixing Properties)

The print pattern used in the aforementioned Experiment 1 (Evaluation for Ejection Properties) was printed on a sheet of a coated paper "OK Topcoat" available from Oji Paper Co., Ltd., in place of the plain paper, and allowed to stand at a temperature of 23° C. and a humidity of 50% for 24 hours. Then, the resulting printed material was subjected to rub fastness test in which the ink image on the printed material was rubbed with a coated paper "OK Topcoat" available from Oji Paper Co., Ltd., as a friction material using a crock meter "QC-621A" available from Imoto Machinery Co., Ltd., 5 times (by 5 reciprocating motions).

After the rub fastness test, the optical density of the ink transferred onto the coated paper used as the friction material was measured by an optical spectrophotometer "SpectroEye" available from Sakata Inx Engineering Co., Ltd.

The smaller the optical density of the ink transferred, the smaller the amount of the ink transferred and therefore the more excellent the fixing properties of the ink.

Experiment 4 (Evaluation for Water Resistance)

The print pattern used in the aforementioned Experiment 1 (Evaluation for Ejection Properties) was printed on a sheet of paper, and allowed to stand at a temperature of 23° C. and a humidity of 50% for 24 hours. Then, the resulting printed material was subjected to water resistance test in which the ink image on the surface of the printed material was rubbed with a cotton swab (100% natural cotton) available from Johnson & Johnson K.K. impregnated with ion-exchanged water 10 times (by 10 reciprocating motions). Thereafter, the optical density of the ink image on the surface of the printed material rubbed was measured. As the value of the optical density became smaller, the ink was more deteriorated in water resistance. The water resistance of the ink was evaluated according to the following ratings.

(Evaluation Ratings)

Difference in optical density=(optical density of ink image on printed material after rubbing)−(optical density of ink image on printed material before rubbing)

As the difference in optical density between the ink images on the printed material before and after rubbing becomes closer to 0, the amount of the ink rubbed off becomes smaller, and the ink exhibits more excellent water resistance.

TABLE 1-1

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Polymer dispersant | | | | | | | | | | | |
| Preparation Examples | 2 | 2 | 2 | 2 | 2 | 2 | 2 | 2 | 2 | 2 | 2 |
| Number-average molecular weight | 12000 | 12000 | 12000 | 12000 | 12000 | 12000 | 12000 | 12000 | 12000 | 12000 | 12000 |
| Kind of polymer | (b) | (b) | (b) | (b) | (b) | (b) | (b) | (b) | (b) | (b) | (b) |
| Acid value of polymer | 240 | 240 | 240 | 240 | 240 | 240 | 240 | 240 | 240 | 240 | 240 |
| Neutralizing agent | NaOH | NaOH | NaOH | NaOH | NaOH | NaOH | KOH | NaOH | NaOH | NaOH | NaOH |
| Pigment water dispersion | | | | | | | | | | | |
| Production Examples | 2 | 3 | 3 | 3 | 4 | 4 | 5 | 4 | 4 | 4 | 7 |
| Neutralization degree | 20 | 30 | 30 | 30 | 40 | 40 | 40 | 40 | 40 | 40 | 50 |
| Amount of neutralizing agent (part(s)) | 5.1 | 7.6 | 7.6 | 7.6 | 10.1 | 10.1 | 10.1 | 10.1 | 10.1 | 10.1 | 12.7 |
| pH before crosslinking | 6.0 | 6.7 | 6.7 | 6.7 | 6.8 | 6.8 | 6.8 | 6.8 | 6.8 | 6.8 | 6.9 |
| Average particle size (nm) | 123 | 105 | 105 | 105 | 100 | 100 | 95 | 100 | 100 | 100 | 93 |
| Production of water-based pigment dispersion | | | | | | | | | | | |
| Crosslinking agent | EX-321 | EX-321 | EX-321 | EX-321 | EX-321 | EX-321 | EX-321 | EX-411 | EX-321 | EX-321 | EX-321 |
| Crosslinking degree (mol %) | 30 | 30 | 40 | 50 | 20 | 25 | 25 | 25 | 35 | 40 | 35 |
| Amount of crosslinking agent (part(s)) | 0.72 | 0.72 | 0.96 | 1.2 | 0.48 | 0.6 | 0.6 | 0.98 | 0.84 | 0.96 | 0.84 |
| pH after crosslinking | 7.5 | 7.6 | 8.5 | 9 | 7.4 | 8 | 8 | 8.3 | 8 | 8 | 8.2 |
| (100 − neutralization degree − crosslinking degree) | 50 | 40 | 30 | 20 | 40 | 35 | 35 | 35 | 25 | 90 | 15 |
| Condition 1 (mgKOH/g) | 120 | 96 | 72 | 48 | 96 | 84 | 84 | 84 | 60 | 48 | 36 |
| Condition 2 (mgKOH/g) | 48 | 72 | 72 | 72 | 96 | 96 | 96 | 96 | 96 | 96 | 120 |
| Condition 3 (mgKOH/g) | 72 | 72 | 96 | 120 | 48 | 60 | 60 | 60 | 84 | 96 | 84 |
| Evaluation results of ink | | | | | | | | | | | |
| Average particle size (nm) after being reacted with crosslinking agent | 120 | 110 | 110 | 110 | 100 | 100 | 96 | 100 | 105 | 105 | 95 |
| Evaluation for ejection properties (number of white lines) | 0 | 0 | 0 | 0 | 0 | 0 | 0 | 0 | 0 | 0 | 0 |
| Evaluation for storage stability (at 20° C.) | 5% | 3% | 2% | 1% | 3% | 1% | 2% | 2% | 2% | 2% | 3% |
| Evaluation for storage stability (at 60° C.) | 10% | 10% | 7% | 10% | 10% | 1% | 5% | 2% | 2% | 3% | 5% |
| Evaluation for fixing properties | 0.25 | 0.13 | 0.15 | 0.21 | 0.18 | 0.1 | 0.13 | 0.15 | 0.17 | 0.2 | 0.25 |
| Evaluation for water resistance | −0.15 | −0.22 | −0.15 | −0.15 | −0.1 | −0.1 | −0.15 | −0.12 | −0.12 | −0.15 | −0.18 |

TABLE 2-1

| | Comparative Examples | | | | | | | | |
|---|---|---|---|---|---|---|---|---|---|
| | 1 | 2 | 3 | 4 | 5 | 6 | 7 | 8 | 9 |
| Polymer dispersant | | | | | | | | | |
| Preparation Examples | 1 | 2 | 2 | 2 | 2 | 2 | 2 | 3 | 4 |
| Number-average molecular weight | 11000 | 12000 | 12000 | 12000 | 12000 | 12000 | 12000 | 12500 | 11000 |
| Kind of polymer | (a) | (b) | (b) | (b) | (b) | (b) | (b) | (c) | (d) |
| Acid value of polymer | 150 | 240 | 240 | 240 | 240 | 240 | 240 | 370 | 150 |
| Neutralizing agent | NaOH | NaOH | Triethyl amine | NaOH | NaOH | NaOH | Triethyl amine | NaOH | NaOH |
| Pigment water dispersion | | | | | | | | | |
| Production Examples | 1 | 4 | 6 | 7 | 8 | 9 | 10 | 11 | 12 |
| Neutralization degree | 40 | 40 | 40 | 50 | 60 | 100 | 100 | 40 | 40 |
| Amount of neutralizing agent (part(s)) | 6.3 | 10.1 | 4.3 | 12.7 | 15.2 | 25.4 | 10.8 | 15.6 | 6.3 |
| pH before crosslinking | 7.1 | 6.8 | 6.2 | 6.9 | 7.0 | 8.9 | 6.8 | 6.4 | 7.1 |
| Average particle size (nm) | 131 | 100 | 140 | 93 | 95 | 140 | 125 | 130 | 111 |
| Production of water-based pigment dispersion | | | | | | | | | |
| Crosslinking agent | EX-321 | EX-521 | EX-321 | EX-321 | EX-321 | EX-321 | EX-321 | EX-321 | EX-321 |
| Crosslinking degree (mol %) | 40 | 25 | 25 | 40 | 30 | 30 | 30 | 30 | 30 |
| Amount of crosslinking agent (part(s)) | 0.6 | 0.78 | 0.6 | 0.96 | 0.72 | 0.72 | 0.72 | 0.96 | 0.45 |
| pH after crosslinking | 8.8 | 7.9 | 7.6 | 8.2 | 9.2 | 9.8 | 8.2 | 7.6 | 8.2 |
| (100 − neutralization degree − crosslinking degree) | 20 | 35 | 35 | 10 | 10 | −30 | −30 | 30 | 30 |
| Condition 1 (mgKOH/g) | 30 | 84 | 84 | 24 | 24 | −72 | −72 | 111 | 45 |
| Condition 2 (mgKOH/g) | 60 | 96 | 96 | 120 | 144 | 240 | 240 | 148 | 60 |
| Condition 3 (mgKOH/g) | 60 | 60 | 60 | 96 | 72 | 72 | 72 | 111 | 45 |
| Evaluation results of ink | | | | | | | | | |
| Average particle size (nm) after being reacted with crosslinking agent | 130 | 100 | 150 | 95 | 100 | 139 | 140 | 140 | 110 |
| Evaluation for ejection properties (number of white lines) | 4 | 7 | 10 | 3 | 0 | 8 | 10 | 10 | 2 |
| Evaluation for storage stability (at 20° C.) | 5% | 5% | 5% | 3% | 3% | 5% | 8% | 5% | 2% |
| Evaluation for storage stability (at 60° C.) | 16% | 25% | 30% | 7% | 10% | 15% | 35% | 15% | 10% |
| Evaluation for fixing properties | 0.3 | 0.3 | 0.35 | 0.28 | 0.30 | 0.30 | 0.38 | 0.35 | 0.25 |
| Evaluation for water resistance | −0.25 | −0.25 | −0.25 | −0.23 | −0.28 | −0.30 | −0.32 | −0.35 | −0.15 |

Example 12

One hundred (100) parts of the pigment water dispersion 13 obtained in Production Example 13 (solid content: 20%) was filled in a screw-neck glass bottle, and 0.75 part of the aforementioned "DENACOL EX-321" as a crosslinking agent was added to the bottle, followed by hermetically sealing the bottle with a screw cap. The contents of the bottle were heated at 70° C. for 5 hours while stirring with a stirrer. Thereafter, the contents of the bottle were subjected to filtration in the same manner as in Example 1, thereby obtaining a water-based pigment dispersion 12.

Using the resulting water-based pigment dispersion, the water-based ink was prepared in the same manner as described above, and then subjected to the aforementioned Experiments 1 to 4 to evaluate the properties of the water-based ink. The results are shown in Table 3.

Example 13

One hundred (100) parts of the pigment water dispersion 14 obtained in Production Example 14 (solid content: 20%) was filled in a screw-neck glass bottle, and 0.60 part of the aforementioned "DENACOL EX-321" was added to the bottle, followed by hermetically sealing the bottle with a screw cap. The contents of the bottle were heated at 70° C. for 5 hours while stirring with a stirrer. Thereafter, the contents of the bottle were subjected to filtration in the same manner as in Example 1, thereby obtaining a water-based pigment dispersion 13. Subsequently, the same evaluation procedure as in Example 12 was conducted. The results are shown in Table 3.

Example 14

One hundred (100) parts of the pigment water dispersion 15 obtained in Production Example 15 (solid content: 20%) was filled in a screw-neck glass bottle, and 0.9 part of the aforementioned "DENACOL EX-321" was added to the bottle, followed by hermetically sealing the bottle with a screw cap. The contents of the bottle were heated at 70° C. for 5 hours while stirring with a stirrer. Thereafter, the contents of the bottle were subjected to filtration in the same manner as in Example 1, thereby obtaining a water-based pigment dispersion 14. Subsequently, the same evaluation procedure as in Example 12 was conducted. The results are shown in Table 3.

Comparative Example 10

One hundred (100) parts of the pigment water dispersion 16 obtained in Production Example 16 (solid content: 20%) was filled in a screw-neck glass bottle, and 0.96 part of the aforementioned "DENACOL EX-321" was added to the bottle, followed by hermetically sealing the bottle with a screw cap. The contents of the bottle were heated at 70° C. for 5 hours while stirring with a stirrer. Thereafter, the contents of the bottle were subjected to filtration in the same manner as in Example 1, thereby obtaining a comparative water-based pigment dispersion 10. Subsequently, the same evaluation procedure as in Example 12 was conducted. The results are shown in Table 3.

Example 15

One hundred (100) parts of the pigment water dispersion 17 obtained in Production Example 17 (solid content: 20%) was filled in a screw-neck glass bottle, and 0.60 part of the aforementioned "DENACOL EX-321" was added to the bottle, followed by hermetically sealing the bottle with a screw cap. The contents of the bottle were heated at 70° C. for 5 hours while stirring with a stirrer. Thereafter, the contents of the bottle were subjected to filtration in the same manner as in Example 1, thereby obtaining a water-based pigment dispersion 15. Subsequently, the same evaluation procedure as in Example 12 was conducted. The results are shown in Table 3.

Example 16

One hundred (100) parts of the pigment water dispersion 18 obtained in Production Example 18 (solid content: 20%) was filled in a screw-neck glass bottle, and 0.72 part of the aforementioned "DENACOL EX-321" was added to the bottle, followed by hermetically sealing the bottle with a screw cap. The contents of the bottle were heated at 70° C. for 5 hours while stirring with a stirrer. Thereafter, the contents of the bottle were subjected to filtration in the same manner as in Example 1, thereby obtaining a water-based pigment dispersion 16. Subsequently, the same evaluation procedure as in Example 12 was conducted. The results are shown in Table 3.

TABLE 3-1

| | Examples | | | Comparative Example | Examples | |
|---|---|---|---|---|---|---|
| | 12 | 13 | 14 | 10 | 15 | 16 |
| Polymer dispersant | | | | | | |
| Preparation Examples | 5 | 6 | 7 | 8 | 9 | 10 |
| Number-average molecular weight | 12500 | 12500 | 13500 | 13500 | 13500 | 14500 |
| Kind of polymer | (e) | (f) | (g) | (h) | (i) | (j) |
| Acid value of polymer | 214 | 240 | 300 | 370 | 241 | 241 |
| Neutralizing agent | NaOH | NaOH | NaOH | NaOH | KOH | NaOH |
| Pigment water dispersion | | | | | | |
| Production Examples | 13 | 14 | 15 | 16 | 17 | 18 |
| Neutralization degree | 40 | 40 | 40 | 40 | 40 | 40 |
| Amount of neutralizing agent (part(s)) | 9.0 | 10.1 | 12.7 | 15.6 | 10.2 | 10.2 |
| pH before crosslinking | 6.6 | 6.5 | 6.4 | 6.4 | 6.4 | 6.3 |
| Average particle size (nm) | 89 | 88 | 95 | 100 | 94 | 100 |
| Production of water-based pigment dispersion | | | | | | |
| Crosslinking agent | EX-321 | EX-321 | EX-321 | EX-321 | EX-321 | EX-321 |
| Crosslinking degree (mol %) | 35 | 25 | 30 | 30 | 25 | 25 |
| Amount of crosslinking agent (part(s)) | 0.75 | 0.6 | 0.9 | 0.96 | 0.6 | 0.72 |
| pH after crosslinking | 7.9 | 7.8 | 7.7 | 7.6 | 7.8 | 7.8 |
| (100 − neutralization degree − crosslinking degree) | 25 | 35 | 30 | 30 | 35 | 35 |
| Condition 1 (mgKOH/g) | 54 | 84 | 90 | 111 | 84 | 84 |
| Condition 2 (mgKOH/g) | 86 | 96 | 120 | 148 | 96 | 96 |
| Condition 3 (mgKOH/g) | 75 | 60 | 90 | 111 | 60 | 60 |
| Evaluation results of ink | | | | | | |
| Average particle size (nm) after being reacted with crosslinking agent | 90 | 90 | 100 | 120 | 95 | 101 |
| Evaluation for ejection properties (number of white lines) | 0 | 0 | 0 | 7 | 0 | 0 |
| Evaluation for storage stability (at 20° C.) | 0% | 0% | 2% | 3% | 2% | 2% |
| Evaluation for storage stability (at 60° C.) | 3% | 2% | 5% | 17% | 8% | 8% |
| Evaluation for fixing properties | 0.07 | 0.05 | 0.06 | 0.25 | 0.1 | 0.07 |
| Evaluation for water resistance | −0.08 | −0.05 | −0.18 | −0.23 | −0.13 | −0.05 |

INDUSTRIAL APPLICABILITY

According to the present invention, it is possible to provide a water-based pigment dispersion having not only excellent storage stability capable of suppressing solidification of a pigment or a polymer in ink ejection nozzles, but also excellent ejection properties and fixing properties, while maintaining good water resistance of the resulting water-based pigment dispersion and water-based ink as an advantage attained by using the pigment therein; and a process for producing a water-based ink.

The invention claimed is:

1. A water-based pigment dispersion comprising a pigment, a polymer dispersant and an aqueous medium in which the pigment is dispersed in the aqueous medium using the polymer dispersant, the polymer dispersant being a water-insoluble polymer comprising carboxy groups that are at least partially neutralized with an alkali metal hydroxide, and having a crosslinked structure obtained by reacting a part of the carboxy groups with a water-insoluble polyfunctional epoxy compound, the acid value of the water-insoluble polymer is not less than 200mgKOH/g and not more than 320 mgKOH/g, said water-based pigment dispersion satisfying the following conditions 1 and 2:

Condition 1: a value calculated according to the formula:

$$\{[100-(\text{neutralization degree})-(\text{crosslinking degree})]/100\} \times (\text{acid value of carboxy group-containing water-insoluble polymer}),$$

being not less than 32 mgKOH/g and not more than 130 mgKOH/g; and

Condition 2: a value calculated according to the formula:

$$[(\text{neutralization degree})/100] \times (\text{acid value of carboxy group-containing water-insoluble polymer}),$$

being not less than 48 mgKOH/g and not more than 144 mgKOH/g, wherein the neutralization degree means a ratio of a mole equivalent number of the alkali metal hydroxide to a mole equivalent number of the carboxy groups of the water-insoluble polymer [(mole equivalent number of alkali metal hydroxide)/(mole equivalent number of carboxy groups of water-insoluble polymer)], and the crosslinking degree means a ratio of a mole equivalent number of epoxy groups of the water-insoluble polyfunctional epoxy compound to a mole equivalent number of the carboxy groups of the water-insoluble polymer [(mole equivalent number of epoxy groups of water-insoluble polyfunctional epoxy compound)/(mole equivalent number of carboxy groups of water-insoluble polymer)].

2. The water-based pigment dispersion according to claim 1, wherein the water-based pigment dispersion further satisfies the following condition 3:

Condition 3: a value calculated according to the formula:

$$[(\text{crosslinking degree})/100] \times (\text{acid value of carboxy group-containing water-insoluble polymer}),$$

being not less than 40 mgKOH/g and not more than 130 mgKOH/g.

3. The water-based pigment dispersion according to claim 1, wherein the water-insoluble polyfunctional epoxy compound is a glycidyl ether compound of a polyhydric alcohol comprising a hydrocarbon group having not less than 3 and not more than 8 carbon atoms.

4. The water-based pigment dispersion according to claim 1, wherein the carboxy group-containing water-insoluble polymer is at least one polymer selected from the group consisting of vinyl-based polymers obtained by addition-polymerizing a vinyl monomer selected from a vinyl compound, a vinylidene compound and a vinylene compound.

5. The water-based pigment dispersion according to claim 1, wherein the carboxy group-containing water-insoluble polymer is a vinyl-based polymer comprising a constitutional unit derived from at least one carboxy group-containing monomer selected from the group consisting of acrylic acid and methacrylic acid, and a constitutional unit derived from at least one hydrophobic monomer selected from the group consisting of an acrylate monomer, a methacrylate monomer and an aromatic group-containing monomer which comprise an alkyl group having not less than 1 and not more than 22 carbon atoms or an aryl group having not less than 6 and not more than 22 carbon atoms.

6. The water-based pigment dispersion according to claim 1, wherein a number-average molecular weight of the water-insoluble polymer is not less than 2,000 and not more than 20,000.

7. The water-based pigment dispersion according to claim 1, wherein a molecular weight of the water-insoluble polyfunctional epoxy compound is not less than 120 and not more than 2,000.

8. The water-based pigment dispersion according to claim 1, wherein a crosslinking degree of the crosslinked water-insoluble polymer is not less than 5 mol % and not more than 80 mol %.

9. The water-based pigment dispersion according to claim 4, wherein the vinyl-based polymer is a vinyl-based polymer comprising a constitutional unit derived from a carboxy group-containing monomer and a constitutional unit derived from a hydrophobic monomer.

10. The water-based pigment dispersion according to claim 9, wherein the constitutional unit derived from a carboxy group-containing monomer is a constitutional unit derived from at least one carboxy group-containing monomer selected from the group consisting of acrylic acid and methacrylic acid.

11. The water-based pigment dispersion according to claim 9, wherein the constitutional unit derived from a hydrophobic monomer is a constitutional unit derived from at least one hydrophobic monomer selected from the group consisting of an acrylate monomer, a methacrylate monomer and an aromatic group-containing monomer which comprise an alkyl group having not less than 1 and not more than 22 carbon atoms or an aryl group having not less than 6 and not more than 22 carbon atoms.

12. The water-based pigment dispersion according to claim 9, wherein a content of the constitutional unit derived from the carboxy group-containing monomer in the vinyl-based polymer is not less than 10% by mass and less than 75% by mass.

13. The water-based pigment dispersion according to claim 9, wherein a content of the constitutional unit derived from the hydrophobic monomer in the vinyl-based polymer is not less than 35% by mass and less than 90% by mass.

14. An ink-jet printing method comprising loading an ink comprising the water-based pigment dispersion according to claim 1 in an ink-jet printer and ejecting droplets of the ink onto a recording medium.

15. A process for producing a water-based ink, comprising the following steps 1 to 4:

Step 1: neutralizing a carboxy group-containing water-insoluble polymer with an alkali metal hydroxide, wherein the acid value of the water-insoluble polymer is not less than 200 mgKOH/g and not more than 320 mgKOH/g;

Step 2: mixing and dispersing the neutralized water-insoluble polymer obtained in the step 1 and a pigment in an aqueous medium to obtain a pigment water dispersion A;

Step 3: subjecting the pigment water dispersion A obtained in the step 2 to crosslinking treatment with a water-insoluble polyfunctional epoxy compound to obtain a water-based pigment dispersion B comprising the crosslinked water-insoluble polymer; and Step 4: mixing the water-based pigment dispersion B obtained in the step 3 with an organic solvent to obtain the water-based ink, said water-based ink satisfying the following conditions 1 and 2 representing a relationship between an acid value and a neutralization degree of the water-insoluble polymer in the step 1, and a crosslinking degree of the water-insoluble polymer in the step 3:

Condition 1: a value calculated according to the formula:

{[100−(neutralization degree)−(crosslinking degree)]/100}×(acid value of carboxy group-containing water-insoluble polymer), being not less than 32 mgKOH/g and not more than 130 mgKOH/g; and Condition 2: a value calculated according to the formula:

[(neutralization degree)/100]×(acid value of carboxy group-containing water-insoluble polymer), being not less than 48 mgKOH/g and not more than 144 mgKOH/g, wherein the neutralization degree means a ratio of a mole equivalent number of the alkali metal hydroxide to a mole equivalent number of the carboxy groups of the water-insoluble polymer [(mole equivalent number of alkali metal hydroxide)/(mole equivalent number of carboxy groups of water-insoluble polymer)], and the crosslinking degree means a ratio of a mole equivalent number of epoxy groups of the water-insoluble polyfunctional epoxy compound to a mole equivalent number of the carboxy groups of the water-insoluble polymer [(mole equivalent number of epoxy groups of water-insoluble polyfunctional epoxy compound)/(mole equivalent number of carboxy groups of water-insoluble polymer)].

16. The process for producing a water-based ink according to claim 15, wherein the water-based ink further satisfies the following condition 3:

Condition 3: a value calculated according to the formula:

[(crosslinking degree)/100]×(acid value of carboxy group-containing water-insoluble polymer), being not less than 40 mgKOH/g and not more than 130 mgKOH/g.

17. The process for producing a water-based ink according to claim 15, wherein the neutralization degree of the carboxy groups of the water-insoluble polymer in the step 1 is not less than 10 mol % and not more than 60 mol %.

18. The process for producing a water-based ink according to claim 15, wherein the crosslinking degree of the water-insoluble polymer crosslinked in the step 3 is not less than 5 mol % and not more than 80 mol %.

19. The process for producing a water-based ink according to claim 15, wherein the carboxy group-containing water-insoluble polymer is at least one polymer selected from the group consisting of vinyl-based polymers obtained by addition-polymerizing a vinyl monomer selected from a vinyl compound, a vinylidene compound and a vinylene compound.

20. The process for producing a water-based ink according to claim 19, wherein the vinyl-based polymer is a vinyl-based polymer comprising a constitutional unit derived from a carboxy group-containing monomer and a constitutional unit derived from a hydrophobic monomer.

* * * * *